US012672094B2

(12) United States Patent
Thomas et al.

(10) Patent No.: US 12,672,094 B2
(45) Date of Patent: Jun. 30, 2026

(54) SIDELINK RANGING FOR POSITIONING REFERENCE SIGNAL TYPES

(71) Applicant: Lenovo (Singapore) Pte. Ltd., New Tech Park (SG)

(72) Inventors: Robin Thomas, Frankfurt am Main (DE); Karthikeyan Ganesan, Kronberg im Taunus (DE); Ankit Bhamri, Rödermark (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 18/548,046

(22) PCT Filed: Feb. 25, 2022

(86) PCT No.: PCT/IB2022/051690
§ 371 (c)(1),
(2) Date: Aug. 25, 2023

(87) PCT Pub. No.: WO2022/180596
PCT Pub. Date: Sep. 1, 2022

(65) Prior Publication Data
US 2024/0137899 A1 Apr. 25, 2024
US 2024/0236917 A9 Jul. 11, 2024

Related U.S. Application Data

(60) Provisional application No. 63/153,783, filed on Feb. 25, 2021.

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 72/25* (2023.01); *H04W 92/18* (2013.01)

(58) Field of Classification Search
CPC ..... H04W 64/00; H04W 72/25; H04W 92/18; H04L 5/0051
(Continued)

(56) References Cited

U.S. PATENT DOCUMENTS

2016/0095080 A1    3/2016  Khoryaev et al.
2018/0059235 A1*   3/2018  McLaughlin ........... G01S 13/20
(Continued)

FOREIGN PATENT DOCUMENTS

WO    2017027450 A1    2/2017
WO    2020198616 A1    10/2020

OTHER PUBLICATIONS

Huawei et al., "Positioning enhancement in Rel-17", 3GPP TSG RAN WG1 Meeting #103-e R1-2007577, Oct. 26-Nov. 13, 2020, pp. 1-17.
(Continued)

*Primary Examiner* — Michael R Neff
(74) *Attorney, Agent, or Firm* — Kunzler Needham Hilton

(57) ABSTRACT

Various aspects of the present disclosure relate to sidelink ranging for positioning reference signal types. One apparatus includes at least one memory and at least one processor that is configured to transmit a sidelink ("SL") ranging configuration comprising one or more SL ranging methods corresponding to a ranging session to a responder device, transmit a SL positioning reference signal ("PRS") to the responder device, receive, according to the one or more SL ranging methods and in response to the SL PRS, a ranging reply and measurement report from the responder device, and estimate ranging information based on the ranging reply
(Continued)

and measurement report received from the responder device to determine a range between the apparatus and the responder device.

20 Claims, 20 Drawing Sheets

(51) Int. Cl.
    H04W 72/25       (2023.01)
    H04W 92/18       (2009.01)

(58) Field of Classification Search
    USPC ...................................................... 455/456.1
    See application file for complete search history.

(56) References Cited

U.S. PATENT DOCUMENTS

| | | | |
|---|---|---|---|
| 2019/0230618 A1 | 7/2019 | Saur et al. | |
| 2020/0154240 A1 | 5/2020 | Edge et al. | |
| 2021/0297206 A1* | 9/2021 | Manolakos | H04W 72/0446 |
| 2021/0329584 A1* | 10/2021 | Prakash | H04W 4/025 |
| 2022/0201774 A1* | 6/2022 | Bao | H04W 72/56 |
| 2022/0240074 A1* | 7/2022 | Choi | H04W 8/005 |

OTHER PUBLICATIONS

PCT/IB2022/051690, "International Search Report and the Written Opinion of the International Searching Authority, or the Declaration", International Searching Authority, May 11, 2022, pp. 1-14.

LG Electronics et al., "New SID: Study on use cases, scenarios, and requirements of sidelink positioning", 3GPP TSG RAN Meeting #88e RP-200859, Jun. 29-Jul. 3, 2020, pp. 1-4.

Intel Corp et al., "NR Positioning Support", TSG RAN meeting #88e RP-201342, Jun. 29-Jul. 3, 2020, pp. 1-30.

3GPP, "3rd Generation Partnership Project; Technical Specification Group Services and System Aspects; Study on enhancements for cyber-physical control applications in vertical domains; Stage 1 (Release 17)", 3GPP TR 22.832 V17.3.0, Sep. 2020, pp. 1-87.

3GPP, "3rd Generation Partnership Project; Technical Specification Group Services and System Aspects; Location Services (LCS); Service description; Stage 1 (Release 16)", 3GPP TS 22.071 V16.0.0, Jul. 2020, pp. 1-55.

3GPP, "3rd Generation Partnership Project; Technical Specification Group Services and System Aspects; Service requirements for cyber-physical control applications in vertical domains; Stage 1 (Release 17)", 3GPP TS 22.104 V17.4.0, Sep. 2020, pp. 1-76.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; Service requirements for the 5G system; Stage 1 (Release 18)", 3GPP TS 22.261 V18.1.1, Jan. 2021, pp. 1-85.

3GPP, "3rd Generation Partnership Project; Technical Specification Group Radio Access Network; LTE Positioning Protocol (LPP) (Release 16)", 3GPP TS 37.355 V16.3.0, Dec. 2020, pp. 1-298.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer measurements (Release 16)", 3GPP TS 38.215 V16.4.0, Dec. 2020, pp. 1-25.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.3.0, Dec. 2020, pp. 1-118.

Ericsson, "Miscellaneous eMIMO corrections", 3GPP TSG-RAN2 Meeting #111 electronic R2-2007577, Aug. 17-28, 2020, pp. 1-6.

Interdigital Inc., "Discussion on On-demand reference signals for positioning", 3GPP RAN WG2 Meeting #113-e R2-2100375, Jan. 25-Feb. 5, 2021, pp. 1-4.

Ericsson, "Summary of Email Discussion [AT113-e][610][POS] Continue discussion of on-demand PRS (Ericsson)", 3GPP TSG-RAN WG2 #113e R2-2102369, Jan. 25-Feb. 5, 2021, pp. 1-6.

* cited by examiner

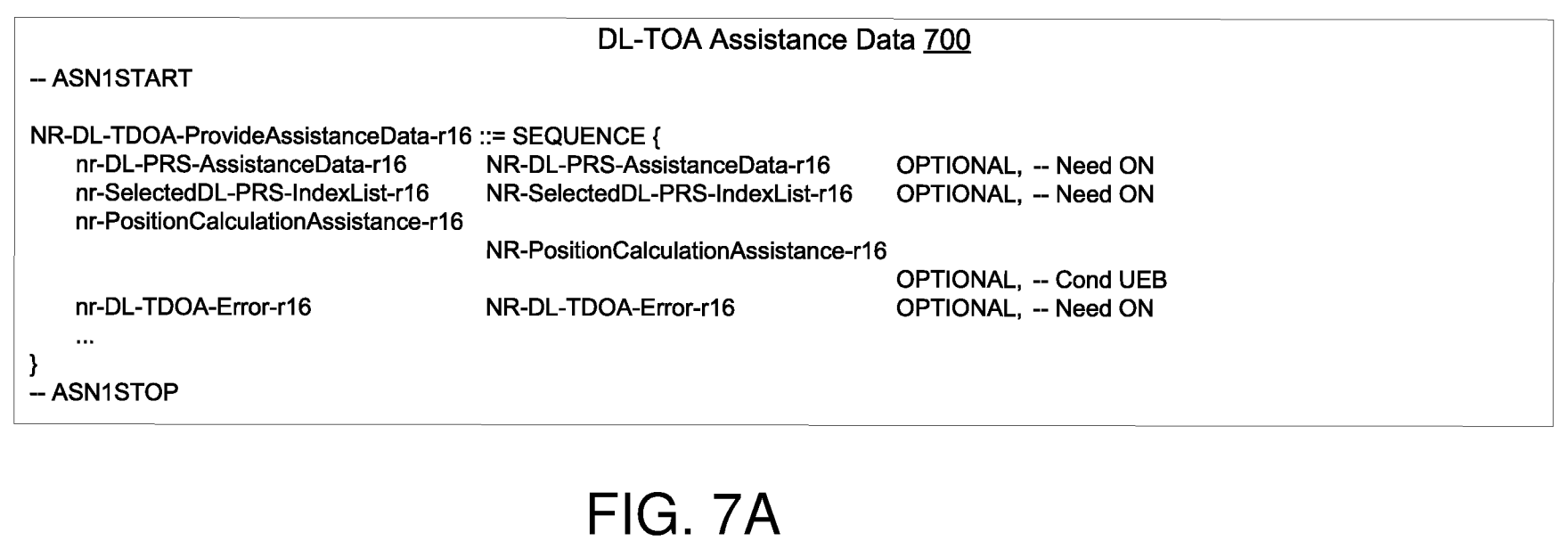

DL-TOA Assistance Data 700

```
- ASN1START

NR-DL-TDOA-ProvideAssistanceData-r16 ::= SEQUENCE {
    nr-DL-PRS-AssistanceData-r16          NR-DL-PRS-AssistanceData-r16          OPTIONAL, -- Need ON
    nr-SelectedDL-PRS-IndexList-r16       NR-SelectedDL-PRS-IndexList-r16       OPTIONAL, -- Need ON
    nr-PositionCalculationAssistance-r16
                                          NR-PositionCalculationAssistance-r16
                                                                                OPTIONAL, -- Cond UEB
    nr-DL-TDOA-Error-r16                  NR-DL-TDOA-Error-r16                  OPTIONAL, -- Need ON
    ...
}

- ASN1STOP
```

FIG. 7A

```
                          DL-TOA Measurement Report 750
-- ASN1START

NR-DL-TDOA-SignalMeasurementInformation-r16 ::= SEQUENCE {
    dl-PRS-ReferenceInfo-r16     DL-PRS-IdInfo-r16,
    nr-DL-TDOA-MeasList-r16          NR-DL-TDOA-MeasList-r16,
    ...
}

NR-DL-TDOA-MeasList-r16 ::= SEQUENCE (SIZE(1..nrMaxTRPs-r16)) OF
                          NR-DL-TDOA-MeasElement-r16

NR-DL-TDOA-MeasElemnt-r16 ::= SEQUENCE {
    trp-ID-r16                  TRP-ID-r16,
    nr-DL-PRS-ResourceId-r16    NR-DL-PRS-ResourceId-r16            OPTIONAL,
    nr-DL-PRS-ResourceSetId-r16     NR-DL-PRS-ResourceSetId-r16    OPTIONAL,
    nr-TimeStamp-r16            NR-TimeStamp-r16,
    nr-RSTD-r16                     CHOICE {
            k0-r16                  INTEGER (0..1970049),
            k1-r16                  INTEGER (0..985025),
            k2-r16                  INTEGER (0..492513),
            k3-r16                  INTEGER (0..246257),
            k4-r16                  INTEGER (0..123129),
            k5-r16                  INTEGER (0..61565),
            ...
    },
    nr-AdditionalPathList-r16       NR-AdditionalPathList-r16      OPTIONAL,
    nr-TimingQuality-r16        NR-TimingQuality-r16,
    nr-DL-PRS-RSRP-Result-r16       INTEGER (0..126)               OPTIONAL,
    nr-DL-TDOA-AdditionalMeasurements-r16
                               NR-DL-TDOA-AdditionalMeasurements-r16   OPTIONAL,
    ...
}

NR-DL-TDOA-AdditionalMeasurements-r16 ::= SEQUENCE (SIZE (1..3)) OF
                                NR-DL-TDOA-AdditionalMeasurementElement-r16

NR-DL-TDOA-AdditionalMeasurementElement-r16 ::= SEQUENCE {
    nr-DL-PRS-ResourceId-r16    NR-DL-PRS-ResourceId-r16           OPTIONAL,
    nr-DL-PRS-ResourceSetId-r16     NR-DL-PRS-ResourceSetId-r16    OPTIONAL,
    nr-TimeStamp-r16           NR-TimeStamp-r16,
    nr-RSTD-ResultDiff-r16          CHOICE {
            k0-r16                  INTEGER (0..8191),
            k1-r16                  INTEGER (0..4095),
            k2-r16                  INTEGER (0..2047),
            k3-r16                  INTEGER (0..1023),
            k4-r16                  INTEGER (0..511),
            k5-r16                  INTEGER (0..255),
            ...
    },
    nr-TimingQuality-r16        NR-TimingQuality-r16,
    nr-DL-PRS-RSRP-ResultDiff-r16   INTEGER (0..61)                OPTIONAL,
    nr-AdditionalPathList-r16       NR-AdditionalPathList-r16      OPTIONAL,
    ...
}

-- ASN1STOP
```

FIG. 7B

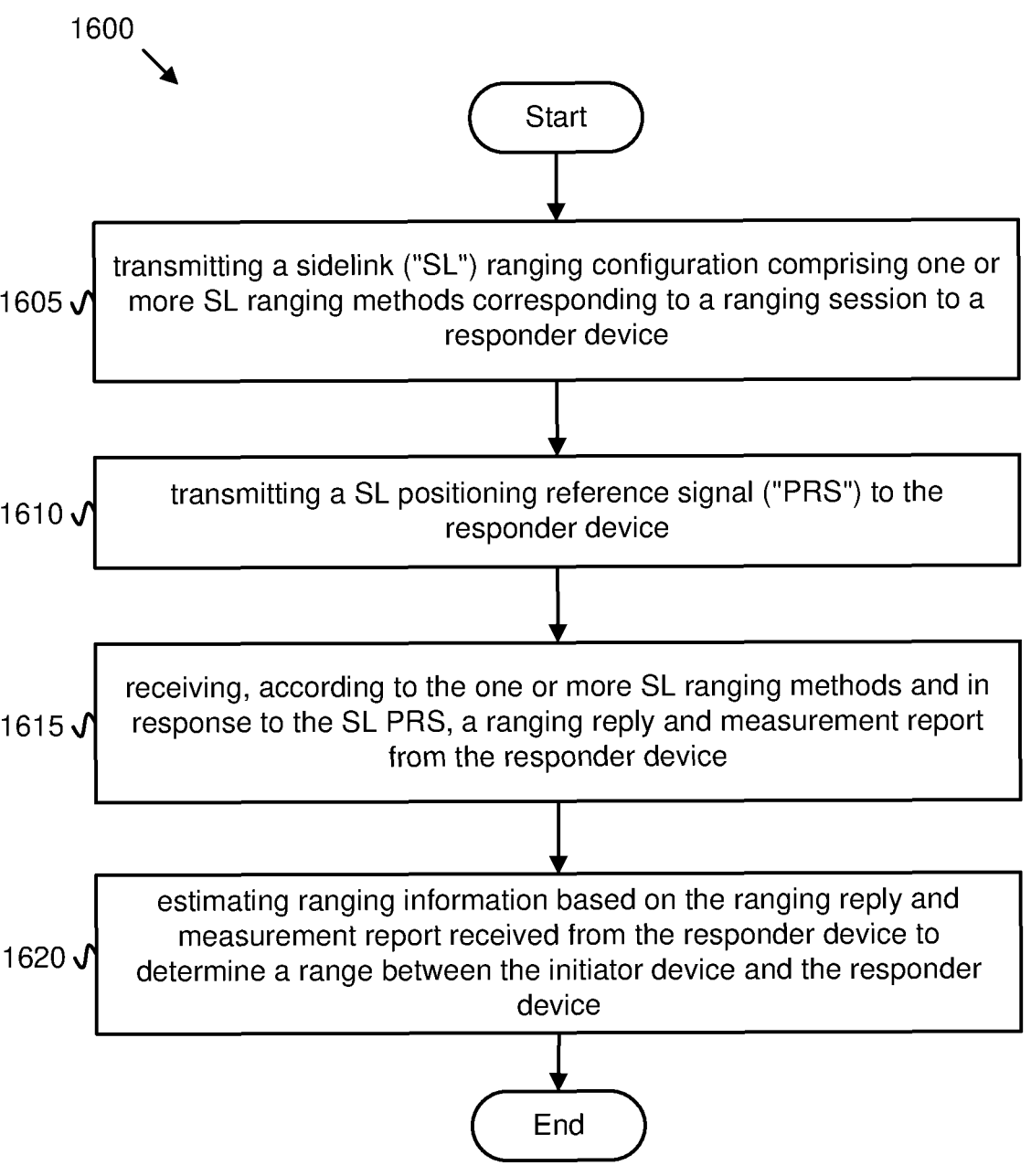

1600

Start

1605 ✓    transmitting a sidelink ("SL") ranging configuration comprising one or more SL ranging methods corresponding to a ranging session to a responder device 1610 ✓    transmitting a SL positioning reference signal ("PRS") to the responder device 1615 ✓    receiving, according to the one or more SL ranging methods and in response to the SL PRS, a ranging reply and measurement report from the responder device 1620 ✓    estimating ranging information based on the ranging reply and measurement report received from the responder device to determine a range between the initiator device and the responder device End

FIG. 16

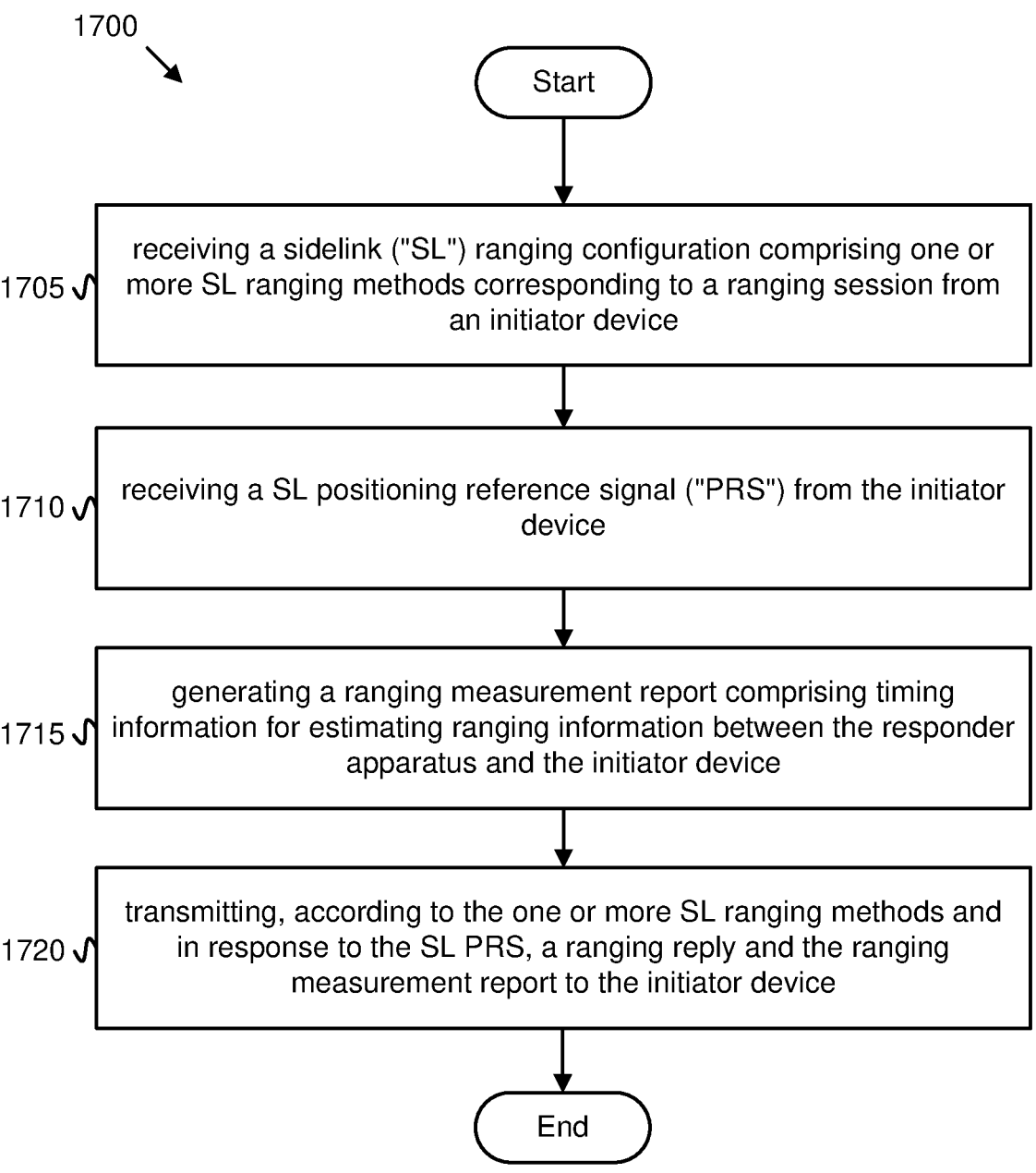

1700

Start

1705 ✓  receiving a sidelink ("SL") ranging configuration comprising one or more SL ranging methods corresponding to a ranging session from an initiator device 1710 ✓  receiving a SL positioning reference signal ("PRS") from the initiator device 1715 ✓  generating a ranging measurement report comprising timing information for estimating ranging information between the responder apparatus and the initiator device 1720 ✓  transmitting, according to the one or more SL ranging methods and in response to the SL PRS, a ranging reply and the ranging measurement report to the initiator device End

FIG. 17

SIDELINK RANGING FOR POSITIONING REFERENCE SIGNAL TYPES

CROSS-REFERENCE TO RELATED APPLICATIONS

This application claims the benefit of U.S. Provisional Patent Application No. 63/153,783, entitled "SIDELINK RANGING METHODS AND CONFIGURATION" and filed on Feb. 25, 2021, for Robin Thomas et al., which is incorporated herein by reference.

FIELD

The subject matter disclosed herein relates generally to wireless communications and more particularly relates to sidelink ranging for positioning reference signal types.

BACKGROUND

In certain wireless communication systems, although there exists a third-generation partnership project ("3GPP") positioning framework, which enables user equipment ("UE")-assisted and UE-based positioning methods, there is currently a lack of support for efficient UE-to-UE range determination, which is essential to support relative positioning applications across different vertical services, e.g., vehicle-to-everything ("V2X"), public safety, industrial internet of things ("IIoT"), commercial, and/or the like.

BRIEF SUMMARY

Disclosed are procedures for sidelink ranging for positioning reference signal types. The procedures may be implemented by apparatus, systems, methods, or computer program products.

In one embodiment, a first apparatus includes a transceiver that transmits a sidelink ("SL") ranging configuration comprising one or more SL ranging methods corresponding to a ranging session to a responder device, transmits a SL positioning reference signal ("PRS") to the responder device, and receives, according to the one or more SL ranging methods and in response to the SL PRS, a ranging reply and measurement report from the responder device. In one embodiment, the first apparatus includes a processor that estimates ranging information based on the ranging reply and measurement report received from the responder device to determine a range between the initiator apparatus and the responder device.

In one embodiment, a first method transmits a sidelink ("SL") ranging configuration comprising one or more SL ranging methods corresponding to a ranging session to a responder device, transmits a SL positioning reference signal ("PRS") to the responder device, and receives, according to the one or more SL ranging methods and in response to the SL PRS, a ranging reply and measurement report from the responder device. In one embodiment, the first method estimates ranging information based on the ranging reply and measurement report received from the responder device to determine a range between the initiator apparatus and the responder device.

In one embodiment, a second apparatus includes a transceiver that receives a sidelink ("SL") ranging configuration comprising one or more SL ranging methods corresponding to a ranging session from an initiator device and receives a SL positioning reference signal ("PRS") from the initiator device. In one embodiment, the second apparatus includes a processor that generates a ranging measurement report comprising timing information for estimating ranging information between the responder apparatus and the initiator device. In one embodiment, the transceiver transmits, according to the one or more SL ranging methods and in response to the SL PRS, a ranging reply and the ranging measurement report to the initiator device.

In one embodiment, a second method receives a sidelink ("SL") ranging configuration comprising one or more SL ranging methods corresponding to a ranging session from an initiator device and receives a SL positioning reference signal ("PRS") from the initiator device. In one embodiment, the second method generates a ranging measurement report comprising timing information for estimating ranging information between the responder apparatus and the initiator device. In one embodiment, the second method transmits, according to the one or more SL ranging methods and in response to the SL PRS, a ranging reply and the ranging measurement report to the initiator device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is one embodiment of DL-TDOA assistance data;

FIG. 7B is one embodiment of DL-TDOA measurement report;

FIG. 16 is a block diagram illustrating one embodiment of a first method for sidelink ranging for positioning reference signal types; and FIG. 17 is a block diagram illustrating one embodiment of a second method for sidelink ranging for positioning reference signal types.

DETAILED DESCRIPTION

Figure 1:
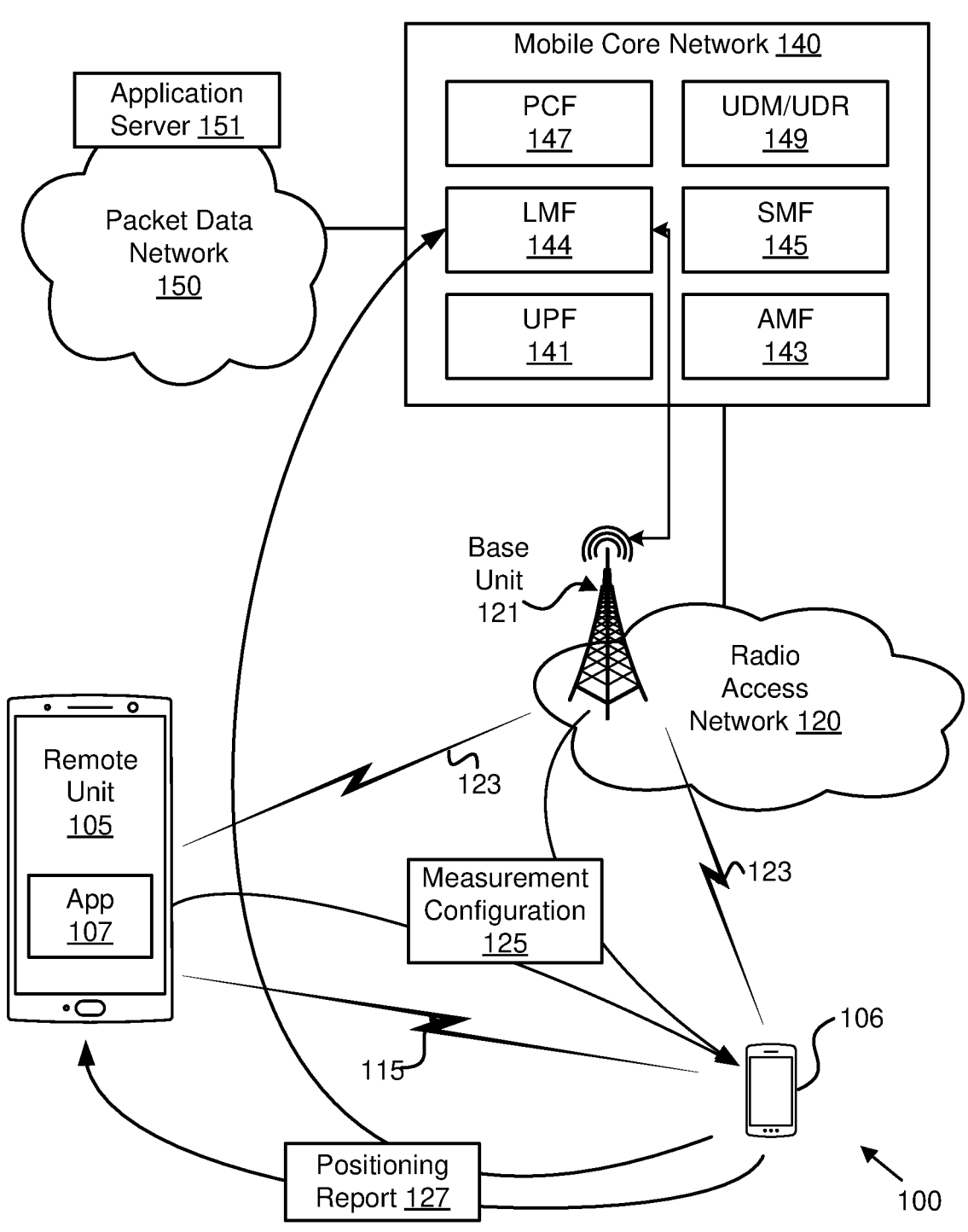
FIG. 1 is a schematic block diagram illustrating one embodiment of a wireless communication system for sidelink ranging for positioning reference signal types.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for sidelink ranging for positioning reference signal types. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Although there exists a 3GPP positioning framework, which enables UE-assisted and UE-based positioning methods, there is currently a lack of support for efficient UE-to-UE range determination, which is essential to support relative positioning applications across different vertical services, e.g., V2X, public safety, IIoT, commercial, and/or the like. The present disclosure includes the ranging methods and associated configurations required to enable ranging using different PRS Types, each with the capability of providing enhanced accuracy for determining the range and orientation between a pair of UEs and/or multiple pair of UEs in a group. Furthermore, the present disclosure aims to detail procedural solutions and configurations required to enable sidelink ("SL") ranging using different positioning reference signal ("PRS") types based on a set of enhanced round-trip time timing based and angle of arrival ("AoA"), direction of arrival ("DoA"), and angle of departure ("AoD") estimates.

In one embodiment, the proposed solutions describe enhanced ranging methods designed for different PRS Type configurations. Such methods enable improved SL relative range and orientation estimation between one-to-one, one-to-many and many-to-many UEs. In one embodiment, the small (e.g., nanosecond) time resolution of enabling pulse-based waveforms such as PRS Type 3 signals for ranging enables high accuracy and energy efficient relative positioning between devices and a signaling framework is developed within SL to support such features. The energy efficiency stems from the short pulse durations of the ranging signals depending on the pulse repetition factors. In one embodiment, using narrow pulses over large bandwidths in SL can enable path separation, making it resilient in multipath environments and therefore improving the relative location estimate. In one embodiment, a framework for enabling SL ranging using different PRS Type signals is also detailed.

FIG. 1 depicts a wireless communication system 100 for sidelink ranging for positioning reference signal types, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example World-wide Interoperability for Microwave Access ("WiMAX") or IEEE 802.16-family standards, among other networks. The present disclosure is not intended to be limited to the implementation of any wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first frequency range and/or a cell operating using a second frequency range.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

To establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, e.g., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (e.g., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 144, a Unified Data Management function ("UDM'") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration of the UPF 141 for proper traffic routing.

The LMF 144 receives positioning measurements or estimates from RAN 120 and the remote unit 105 (e.g., via the AMF 143) and computes the position of the remote unit 105. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Policy Control Function ("PCF") (which provides policy rules to CP functions), a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

As discussed in greater detail below, the remote unit 105 may be an initiator device and transmits a positioning measurement configuration 125 to a responder device 106. In some embodiments, the initiator device may be a base unit 121, e.g., a gNB. In one embodiment, the initiator device receives a positioning/measurement report 127 from the responder device 106. In one embodiment, the initiator device sends the measurement configuration, and/or other configurations, and receives the positioning report 127 over a sidelink connection 115 between the initiator device and the responder device 106. As used herein, a sidelink connection 115 allows remote units 105 to communicate directly with each other (e.g., device-to-device communication) using sidelink (e.g., V2X communication) signals.

While FIG. 1 depicts components of a 5G RAN and a 5G core network, the described embodiments for sidelink ranging for positioning reference signal types apply to other types of communication networks and RATs, including IEEE 802.11 variants, Global System for Mobile Communications ("GSM", e.g., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the proposed solutions/methods are also equally applicable to other mobile communication systems supporting sidelink ranging for positioning reference signal types.

Figure 2:
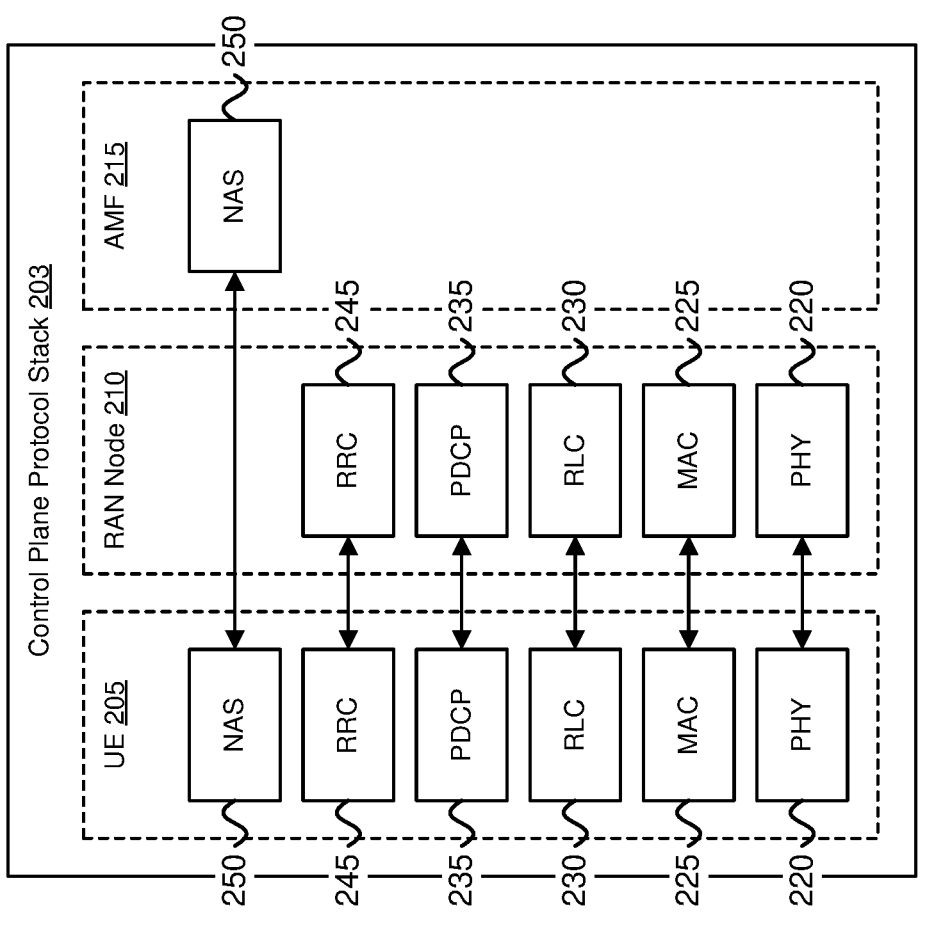
FIG. 2 is a block diagram illustrating one embodiment of a 5G New Radio ("NR") protocol stack.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

As background, for Release 17 ("Rel-17") of the 3GPP specification, the different positioning requirements are especially stringent with respect to accuracy, latency, and reliability. Table 1 shows positioning performance requirements for different scenarios in an Industrial IoT ("IIoT") or indoor factory setting.

TABLE 1

| IIOT Positioning Performance Requirements | | | | | | |
|---|---|---|---|---|---|---|
| Scenario | Horizontal accuracy | Vertical accuracy | Availability | Latency for position estimation of UE | UE Speed | Corresponding Positioning Service Level |
| Mobile control panels with safety functions (non-danger zones) | <5 m | <3 m | 90% | <5 s | N/A | Service Level 2 |
| Process automation - plant asset management | <1 m | <3 m | 90% | <2 s | <30 km/h | Service Level 3 |
| Flexible, modular assembly area in smart factories (for tracking of tools at the work-place location) | <1 m (relative positioning) | N/A | 99% | 1 s | <30 km/h | Service Level 3 |
| Augmented reality in smart factories | <1 m | <3 m | 99% | <15 ms | <10 km/h | Service Level 4 |
| Mobile control panels with safety functions in smart factories (within factory danger zones) | <1 m | <3 m | 99.9% | <1 s | N/A | Service Level 4 |
| Flexible, modular assembly area in smart factories (for autonomous vehicles, only for monitoring proposes) | <50 cm | <3 m | 99% | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | 10 ms | <30 km/h | Service Level 6 |

TABLE 1-continued

| IIOT Positioning Performance Requirements | | | | | | |
| --- | --- | --- | --- | --- | --- | --- |
| Scenario | Horizontal accuracy | Vertical accuracy | Availability | Latency for position estimation of UE | UE Speed | Corresponding Positioning Service Level |
| Inbound logistics for manufacturing (for storage of goods) | <20 cm | <20 cm | 99% | <1 s | <30 km/h | Service Level 7 |

Some UE positioning techniques supported in Rel-16 are listed in Table 2. The separate positioning techniques as indicated in Table 2 may be currently configured and performed based on the requirements of the LMF and/or UE capabilities. Note that Table 2 includes TBS positioning based on PRS signals, but only observed time difference of arrival ("OTDOA") based on LTE signals is supported. The E-CID includes Cell-ID for NR method. The Terrestrial Beacon System ("TBS") method refers to TBS positioning based on Metropolitan Beacon System ("MBS") signals.

TABLE 2

| Supported Rel-16 UE positioning methods | | | | |
| --- | --- | --- | --- | --- |
| Method | UE-based | UE-assisted, LMF-based | NG-RAN node assisted | Secure User Plane Location ("SUPL") |
| A-GNSS | Yes | Yes | No | Yes (UE-based and UE-assisted) |
| OTDOA | No | Yes | No | Yes (UE-assisted) |
| E-CID | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

The transmission of PRS enable the UE to perform UE positioning-related measurements to enable the computation of a UE's location estimate and are configured per Transmission Reception Point ("TRP"), where a TRP may transmit one or more beams.

Figure 3:
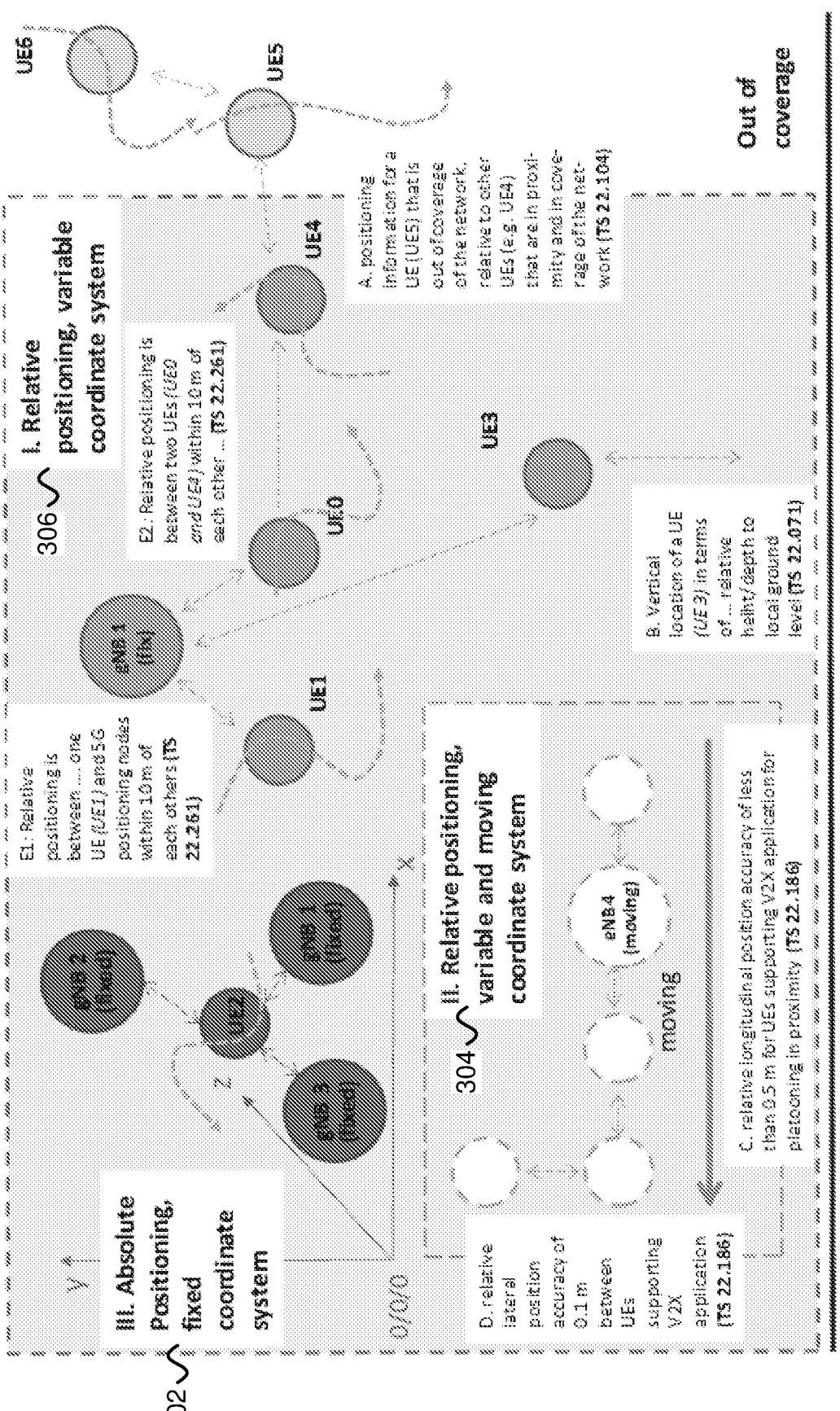
FIG. 3 is a diagram depicting an overview on absolute and relative positioning as defined in Stage 1 specifications.

FIG. 3 depicts one an overview of one embodiment of the absolute and relative positioning scenarios as defined in the architectural (stage 1) specifications using three different co-ordinate systems: Absolute Positioning, fixed coordinate systems 302; Relative Positioning, variable and moving coordinate system 304; and Relative Positioning, variable coordinate system 306.

In one embodiment, the following RAT-dependent positioning techniques may be supported by the system 100:

DL-TDoA: The downlink time difference of arrival ("DL-TDOA") positioning method makes use of the DL RS Time Difference ("RSTD") (and optionally DL PRS RS Received Power ("RSRP") of DL PRS RS Received Quality ("RSRQ")) of downlink signals received from multiple TPs, at the UE (e.g., remote unit 105). The UE measures the DL RSTD (and optionally DL PRS RSRP) of the received signals using assistance data received from the positioning server, and the resulting measurements are used along with other configuration information to locate the UE in relation to the neighboring Transmission Points ("TPs").

DL-AoD: The DL Angle of Departure ("AoD") positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighboring TPs.

Figure 4:
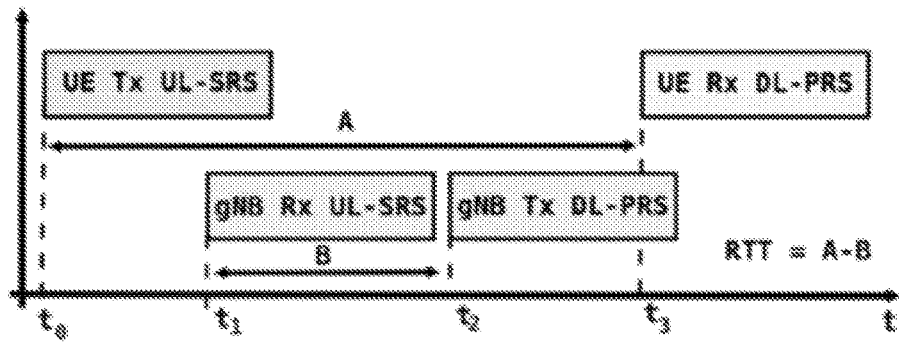
FIG. 4 is a diagram illustrating one embodiment of a Multi-Cell RTT procedure.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE and the gNB Rx-Tx measurements (e.g., measured by RAN node) and UL SRS-RSRP at multiple TRPs of uplink signals transmitted from UE, as shown in FIG. 4.

Figure 5:
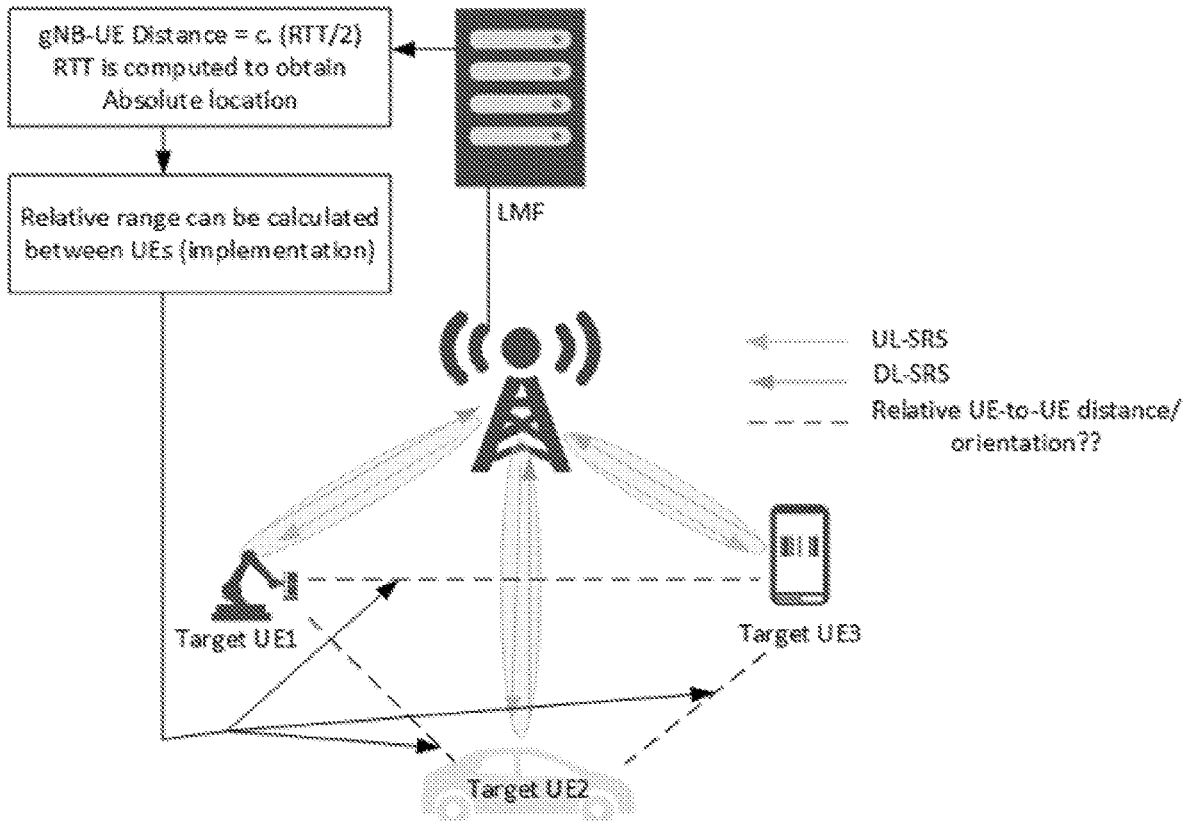
FIG. 5 is a diagram illustrating one embodiment of relative range estimation using the existing single gNB RTT positioning framework.

As shown in FIG. 5, the UE measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE. In one embodiment, Multi-RTT is only supported for UE-assisted/NG-RAN assisted positioning techniques, as noted in Table 2.

E-CID/NR E-CID/Enhanced Cell ID ("CID") positioning method, the position of a UE is estimated with the knowledge of its serving ng-eNB, gNB and cell and is based on LTE signals. The information about the serving ng-eNB, gNB and cell may be obtained by paging, registration, or other methods. NR Enhanced Cell ID ("NR E-CID") positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE generally is not expected to make additional measurements for the sole purpose of positioning; e.g., the positioning procedures do not supply a measurement configuration or measurement control message, and the UE reports the measurements that it has available rather than being required to take additional measurement actions.

UL-TDoA: The UL TDOA positioning method makes use of the UL TDOA (and optionally UL SRS-RSRP) at multiple reception points ("RPs") of uplink signals transmitted from the UE. The RPs measure the UL TDOA (and optionally UL SRS-RSRP) of the received signals using assistance data received from the positioning server, and the resulting measurements are used along with other configuration information to estimate the location of the UE.

UL-AoA: The UL Angle of Arrival ("AoA") positioning method makes use of the measured azimuth and the zenith angles of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

Figure 6:
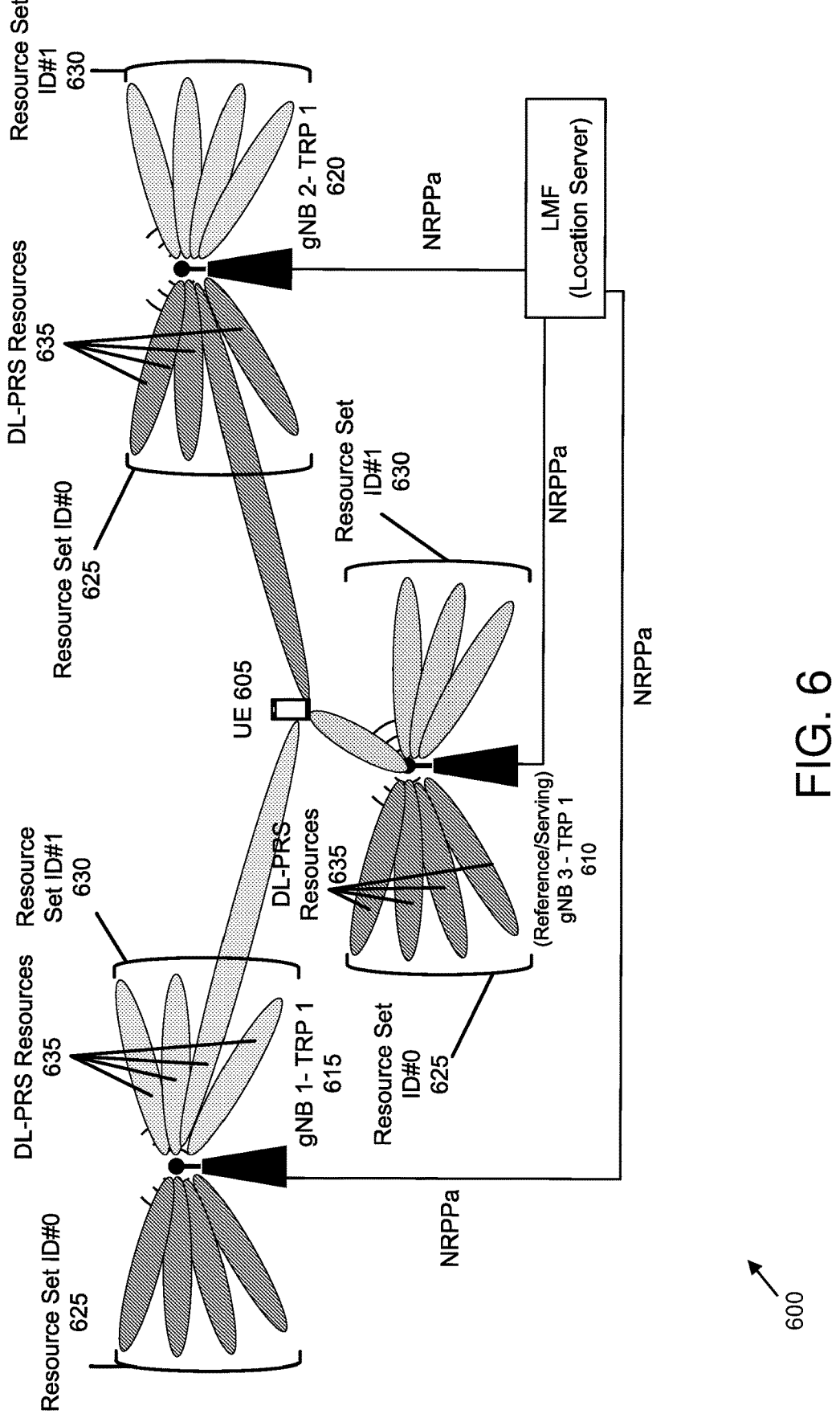
FIG. 6 is a diagram illustrating one embodiment of NR Beam-based positioning.

FIG. 6 depicts a system 600 for NR beam-based positioning. According to Rel-16, the PRS can be transmitted by different base stations (serving and neighboring) using narrow beams over Frequency Range #1 Between ("FR1", e.g., ID 630, and receiving PRS from the gNB 2 620 on a set of PRS Resources 635 from the first Resource Set ID 625.

Similarly, UE positioning measurements such as Reference Signal Time Difference ("RSTD") and PRS RSRP measurements are made between beams as opposed to different cells as was the case in LTE. In addition, there are additional UL positioning methods for the network to exploit to compute the target UE's location. Table 3 lists the RS-to-measurements mapping required for each of the supported RAT-dependent positioning techniques at the UE, and Table 4 lists the RS-to-measurements mapping required for each of the supported RAT-dependent positioning techniques at the gNB.

TABLE 3

UE Measurements to enable RAT-dependent positioning techniques

| DL/UL Reference Signals | UE Measurements | To facilitate support of the following positioning techniques |
|---|---|---|
| Rel-16 DL PRS | DL RSTD | DL-TDOA |
| Rel-16 DL PRS | DL PRS RSRP | DL-TDOA, DL-AoD, Multi-RTT |
| Rel-16 DL PRS/Rel-16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

TABLE 4 gNB Measurements to enable RAT-dependent positioning techniques

| DL/UL Reference Signals | gNB Measurements | To facilitate support of the following positioning techniques |
|---|---|---|
| Rel-16 SRS for positioning | UL RTOA | UL-TDOA |
| Rel-16 SRS for positioning | UL SRS-RSRP | UL-TDOA, UL-AoA, Multi-RTT |
| Rel-16 SRS for positioning, Rel-16 DL PRS | gNB Rx-Tx time difference | Multi-RTT |
| Rel-16 SRS for positioning, | A-AoA and Z-AoA | UL-AoA, Multi-RTT | frequencies from 410 MHz to 7125 MHz) and Frequency Range #2 ("FR2", e.g., frequencies from 24.25 GHz to 52.6 GHz), which is relatively different when compared to LTE where the PRS was transmitted across the whole cell.

As illustrated in FIG. 6, a UE 605 may receive PRS from a first gNB ("gNB 3") 610, which is a serving gNB, and also from a neighboring second gNB ("gNB 1") 615, and a neighboring third gNB ("gNB 2") 620. Here, the PRS can be locally associated with a set of PRS Resources grouped under a Resource Set ID for a base station (e.g., TRP). In the depicted embodiments, each gNB 610, 615, 620 is configured with a first Resource Set ID 625 and a second Resource Set ID 630. As depicted, the UE 605 receives PRS on transmission beams; here, receiving PRS from the gNB 3 610 on a set of PRS Resources 635 from the second Resource Set ID 630, receiving PRS from the gNB 1 615 on a set of PRS Resources 635 from the second Resource Set According to TS38.215, UE measurements have been defined, which are applicable to DL-based positioning techniques (see subclause 2.4). For a conceptual overview of the current implementation in Rel-16, the DL-TDOA assistance data configurations (see FIG. 7A) and measurement reporting information (see FIG. 7B) are provided as illustrative examples. The IE NR-DL-TDOA-ProvideAssistanceData, shown in FIG. 7A, is used by the location server to provide assistance data to enable UE-assisted and UE-based NR downlink TDOA. It may also be used to provide NR DL TDOA positioning specific error reason.

The IE NR-DL-TDOA-SignalMeasurementInformation, shown in FIG. 7B, is used by the target device to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource.

The different DL measurements including DL PRS-RSRP, DL RSTD and UE Rx-Tx Time Difference required for the supported RAT-dependent positioning techniques are shown in Table 5. The following measurement configurations are specified, e.g., in TS 38.215:

i. 4 Pair of DL RSTD measurements can be performed per pair of cells. Each measurement is performed between a different pair of DL PRS Resources/Resource Sets with a single reference timing.

ii. 8 DL PRS RSRP measurements can be performed on different DL PRS resources from the same cell.

configurations in both Mode 1 (in-coverage, partial coverage scenarios) and Mode 2 (out-of-coverage scenarios):

i. SS-RTT—The initiator UE needs the capability to measure the relative clock frequency offset between itself and RX UE, offset increases as reply times get larger ii. DS-RTT—Uses two round-trip time measurements are used and combined to give the TOF result with a reduced error in the presence of uncorrected clock frequency offset even for quite long response delays.

TABLE 1

| DL Measurements required for DL-based positioning methods |
|---|
| DL PRS reference signal received power (DL PRS-RSRP) |

| | |
|---|---|
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |

| DL reference signal time difference (DL RSTD) | |
|---|---|
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

| UE Rx – Tx time difference | |
|---|---|
| Definition | The UE Rx – Tx time difference is defined as $T_{UE-RX} - T_{UE-TX}$ Where: $T_{UE-RX}$ is the UE received timing of downlink subframe #i from a positioning node, defined by the first detected path in time. $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency RRC_CONNECTED inter-frequency |

In one embodiment, the high-level solution of the subject matter disclosed herein provides solutions which detail support for enabling enhanced RTT methods and relative orientation techniques using ranging signals based on different PRS Types, which can improve the accuracy of the ranging estimate. An overview of the methods is presented as follows:

a. Methods to enable single-sided ("SS-RTT"), double-sided ("DS-RTT") and DS-RTT with three messages, AoA estimate relative positioning techniques using the sidelink and where applicable using network-assisted iii. Low latency DS-RTT utilizes three messages to perform ranging and thus reduce overall signaling overhead.

iv. AoA/DoA/AoD estimation also enables relative orientation detection in addition to range estimation for single- and multi-transmit antenna cases.

b. Methods to support the ranging configuration, measurement and reporting of the above timing-based and angle-based ranging techniques are described using the proposed ranging slot framework:

i. Time domain ranging round configuration consisting of three phases of ranging using different PRS Types:

1. The first ranging phase containing the ranging configuration including setup parameters and resources a. Methods to support the configuration of a response time of a ranging message depending on the cast type.

2. The second phase comprising of the ranging measurements and associated replies.

3. The third round consisting of measurement reporting phase, where the measurements are transmitted to the TX-UE or initiator UE or in some ranging methods, the responder UE.

a. Quality of measurements such as Figure-of-Merit signaling are also included in the ranging measurement report.

c. Methods to support multi-node (UE) ranging consisting of different cast types— i. Broadcast (many to many), ii. Groupcast (one-to-many and many-to-one)

iii. Unicast (one-to-one)

It is noted that, as used herein, a controller refers to a device that controls the ranging session and defines the ranging parameters by sending the ranging control information; a controlee refers to a device that utilizes the ranging parameters received from the controller by decoding the ranging control message; an initiator device, following the transmission/reception of the ranging control message, transmits the first ranging message exchange; and a responder device responds to the initial ranging message received from the initiator.

Moreover, even though the embodiments in this disclosure mainly refer to SL ranging methods where the initiating and responding devices are UEs, similar methods could be applied where a base station is the initiating device (using corresponding signaling methods).

Accordingly, in one embodiment, the solutions described herein provide enhanced round trip time and AoA/DoA/AoD ranging methods using different PRS Types will enhance the accuracy and orientation estimation significantly, especially on sidelink. The different PRS Types offer different flexible configurations for ranging/relative location estimation. Furthermore, in one embodiment, the enhanced round trip time methods for sidelink may enable robust and low latency measurements in addition to improved accuracy. In one embodiment, the proposed ranging slot framework can support the transmission of different ranging signals or reference signals for relative location estimation. In one embodiment, the ranging methods can be supported for different cast types including unicast, groupcast and broadcast.

As such, the following embodiments describe the procedures to enable ranging using a pulse-based waveform and enhanced two way ranging estimates. The embodiments may be implemented in combination with each other to enable ranging using different PRS signal types. Hereafter, the considered ranging signals in this disclosure will be referred to as follows:

a. PRS Type 1 Signals use the pseudo random signal sequence design using e.g., a gold sequence as outlined in TS 38.211.

b. PRS Type 2 Signals make use of a Zadoff-chu sequences with orthogonal cyclic shifts.

c. PRS Type 3 Signals make use of a pulse-based waveform (e.g., root raised cosine pulse, sinc pulse) with a ≤2 ns pulse duration with a configured pulse repetition frequency transmitted over a wide bandwidth (e.g., 400 MHz).

d. Furthermore, PRS Type 1, PRS Type 2 and PRS Type 3 signals can be applicable to both the Uu and PC5 interface, although the scope of this disclosure primarily covers methods related to SL (PC5) interface.

Figure 8:
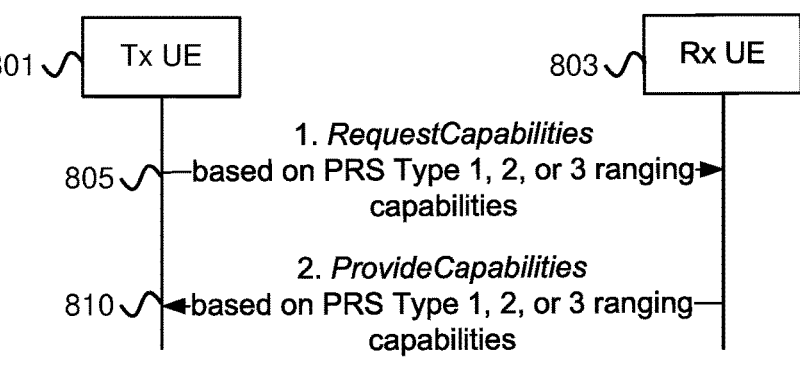
FIG. 8 is a diagram illustrating one embodiment of PRS Type 2 capability exchange signaling.

In a first embodiment, the initial step is to exchange capability information between TX (transmitting UE) and RX (receiver UE) to ascertain support for a secure ranging session using a either PRS Type 1, 2 or 3 signals. FIG. 8 shows the exemplary signaling of the unidirectional capability exchange between a TX 801 and RX 803 UE(s) regarding the support of different PRS Types for ranging. SL signaling may be performed using PC5 RRC or PC5-S protocols. The exchanged information may include the configuration of the desired PRS Type, for example the indices of the symbols used for the pulse-based waveform (PRS type 3) as an offset to the frame/slot boundary.

In one embodiment, at step 1 (see messaging 805), the Tx UE 801 requests the ranging capabilities of the Rx UE 803, based on the PRS type, and the Rx UE 803, at step 2 (see messaging 810) provides the ranging capabilities based on the PRS type.

In another implementation, the TX UE 801 may also append its own capabilities in the request capability message Step 1 of FIG. 8 to avoid bi-directional signaling overhead of the capability exchange of messages. The Tx UE 801 may groupcast its capability and request the capabilities of a group of UEs in its vicinity.

Exemplary information elements which may be shared based on different PRS Type capabilities include sharing of encryption keys required to enable secure ranging, supported ranging methods which may include SS-RTT, DS-RTT, DS-RTT with three messages, AoA, AoD, and/or DoA. These ranging methods that comprise of distance and orientation computation are elaborated upon the subsequent embodiments. Additional capabilities may also include the ability to measure the clock offsets, which are local to the device.

In another implementation, the ranging capabilities of one more combination of PRS Types 1, 2 or 3 can be exchanged in the same manner.

In some embodiments, the Tx UE 801 may share its ranging capabilities for one more combination of PRS Types 1, 2 or 3 and request the Rx UE 803 to share the corresponding ranging capabilities. In one implementation, the Rx UE 803 may share the ranging capabilities for either only on PRS Type 1, PRS Type 2 or PRS Type 3 capabilities, which, in that case, the Tx UE 801 is not expected to perform ranging based on the PRS Type which is not reported by the Rx UE 803.

In another embodiment, the Tx UE 801 and Rx UE 803 may share the different PRS Type ranging capability information as described, with the gNB, gNB co-located with the LMF, and/or external LMF. The capability information may be shared via RRC/MAC CE signaling with the gNB/gNB co-located with the LMF while LPP signaling may be used to share such capability information with the external LMF. In alternative implementation, the capability of the Rx UE(s) 803 and/or Tx UE 801 is sent by the gNB in downlink control information ("DCI") to both sides upon receiving a request from the Tx UE 801.

In a second embodiment, methods to support SS-RTT ranging using a PRS Type 2 signal, which involves the measurement of the round-trip time ("RTT") delay of a single message from e.g., Tx UE to Rx UE and associated

Figure 9A:
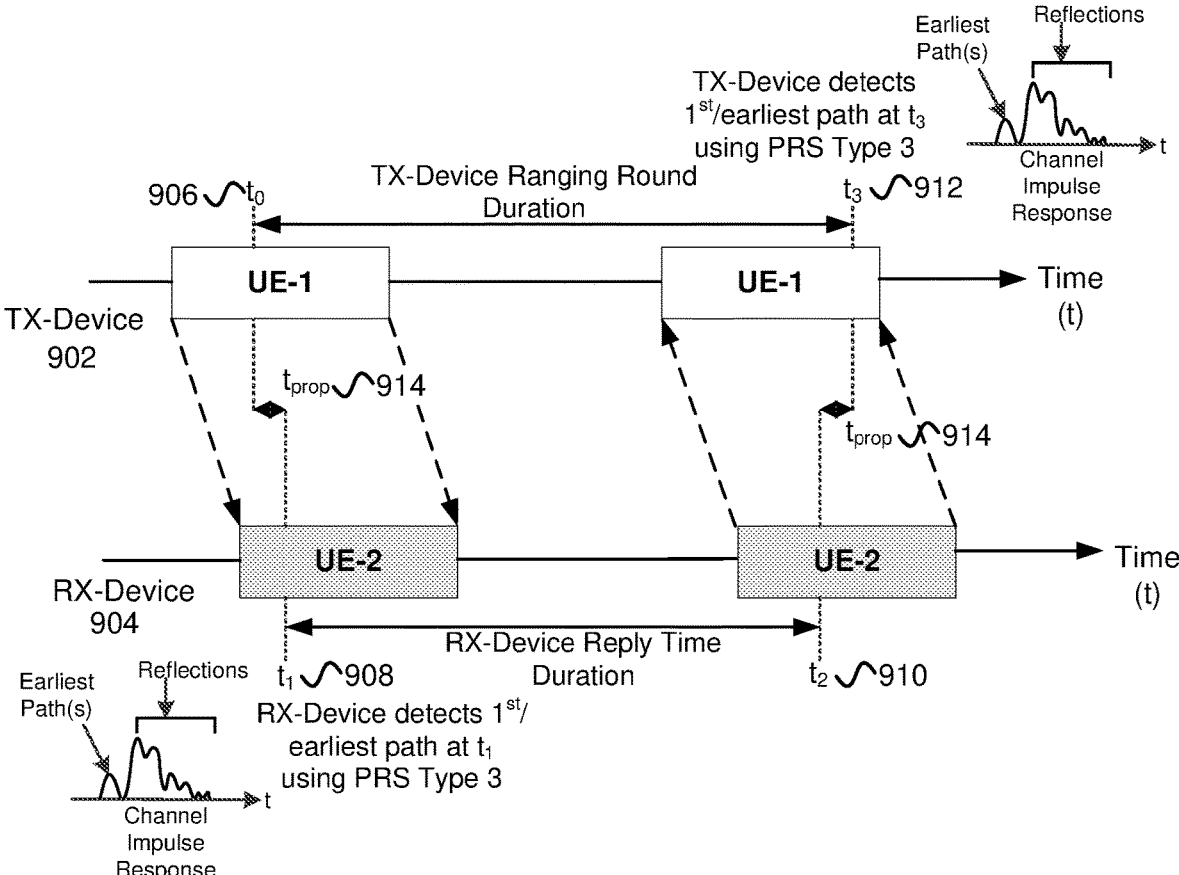
FIG. 9A is a diagram illustrating one embodiment of a SS-RTT ranging procedure using PRS Type 2 for SL.

21 response from a Rx UE to Tx UE using a suitably configured PRS Type signal. The overall procedure is illustrated in FIG. 9A. The steps are outlined as follows with an exemplary PRS Type 3 configuration (can also be applicable to other PRS Types):

i. At time instance to 906, the Tx-device (UE-1) 902 transmits a PRS Type 3 signal, where the reference point for the Tx-Device measurement, in the case of a UE, shall be a Tx antenna connector of the UE.

ii. At time instance $t_1$ 908, the Rx-device (UE-2) 904 receives a PRS Type 3 signal, where the reference point for the Rx-Device time stamp measurement, in the case of a UE, shall be a Rx antenna connector of the UE. The RX-device 904 may measure the PRS Type 3 signal reception according to the time stamp corresponding earliest/first detected path(s). If multiple paths are detected and classified as early paths, these may be grouped, and time stamped accordingly and separated from reflected/scatted paths of the received signal.

iii. UE-1 902 may also transmit the time stamp information to UE-2 904 in addition to a PRS signal.

iv. At time instance $t_2$ 910, UE-2 904 transmits the reply PRS Type 3 signal, where the reference point for the UE-2 time stamp measurement, in the case of a UE, shall be a Tx antenna connector of the Rx-Device 904.

v. At time instance $t_3$ 912, UE-1 902 receives the reply PRS Type 3 signal, where the reference point for the Tx-Device time stamp measurement, in the case of a UE, shall be a Rx antenna connector of the Tx-Device 902.

vi. UE-2 904 may also transmit the time stamp information to UE-1 902 as part of a measurement report.

In one embodiment, the aforementioned reference points may be locally defined with respect to the device. In another implementation, the reference point for UE-1 902 and UE-2 904 measurements can be configured as a globally defined ranging reference point with which all ranging measurements are made. This can be transmitted using a ranging reference symbol/slot/system frame number (e.g., SFN 0).

The signal propagation time ($t_{prop}$) 914, in one embodiment, can be used to derive the range between the devices as function of the UE-1 Ranging Round Duration ($T_{RRD}$) and UE-2 Reply Time Duration ($T_{Reply}$):

$$\hat{t}_{prop} = \frac{T_{RRD} - T_{Reply} - \varepsilon}{2}, \quad (1)$$

where $\varepsilon$ is sum of the absolute clock frequency offset errors, each independently measured at UE-1 and UE-2. In another implementation, UE-1 902 may have the capability to measure the relative clock offset between its own clock and the UE-2 clock and perform the necessary clock offset compensation to determine the estimated $t_{prop}$ 914.

In some implementations, UE-1 902 may concurrently perform SS-RTT with more than one Rx-Device 904, which may either be based on PRS Type 1 or PRS Type 2 or PRS Type 3 signals or a combination of reference signals.

In other implementations, UE-1 902 may sufficiently estimate $T_{Reply}$ within a certain margin based on periodical measurements from the Rx-Device(s) 904. Such measurements can be configured by the network (e.g., gNB or LMF) or signaled from UE-1 902 and requires no additional reporting of the duration, $T_{Reply}$ ($t_2$–$t_1$) from UE-2 side. This is especially applicable for Mode 1 and Mode 2 operations where a UE reserves a set of periodic resources for transmission/reporting.

Additionally, there may be unaccounted timing delays within the baseband and RF which require calibration and such information may be exchanged between UEs for assistance data relating the range estimate computation.

Figure 9B:
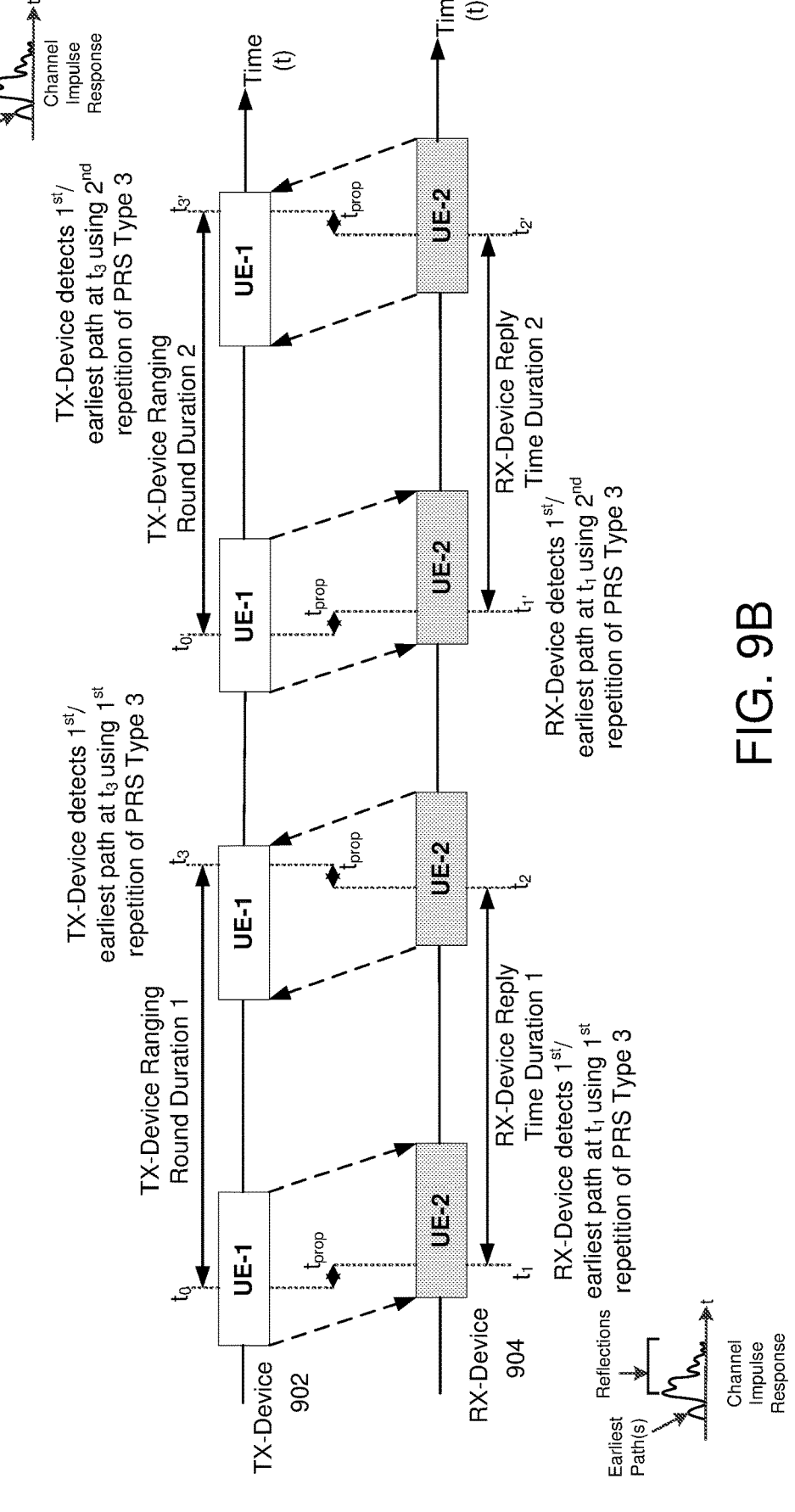
FIG. 9B is a diagram illustrating one embodiment of SS-RTT ranging procedure using repetition of PRS Type 3 SL and repetition of corresponding response.

In some embodiments, the SS-RTT message exchange could be repeated multiple times to increase the accuracy of RTT estimation. In one implementation, PRS Type 3 signals are repeated by the Tx UE 902 and the Rx UE 904 responds for each of the repeated signal as illustrated in FIG. 9B. In this implementation, the Rx UE 902 e.g., UE-2 can provide additional measurements such as time difference between the current reply and one or more of previous replies for increased robustness.

Figure 9C:
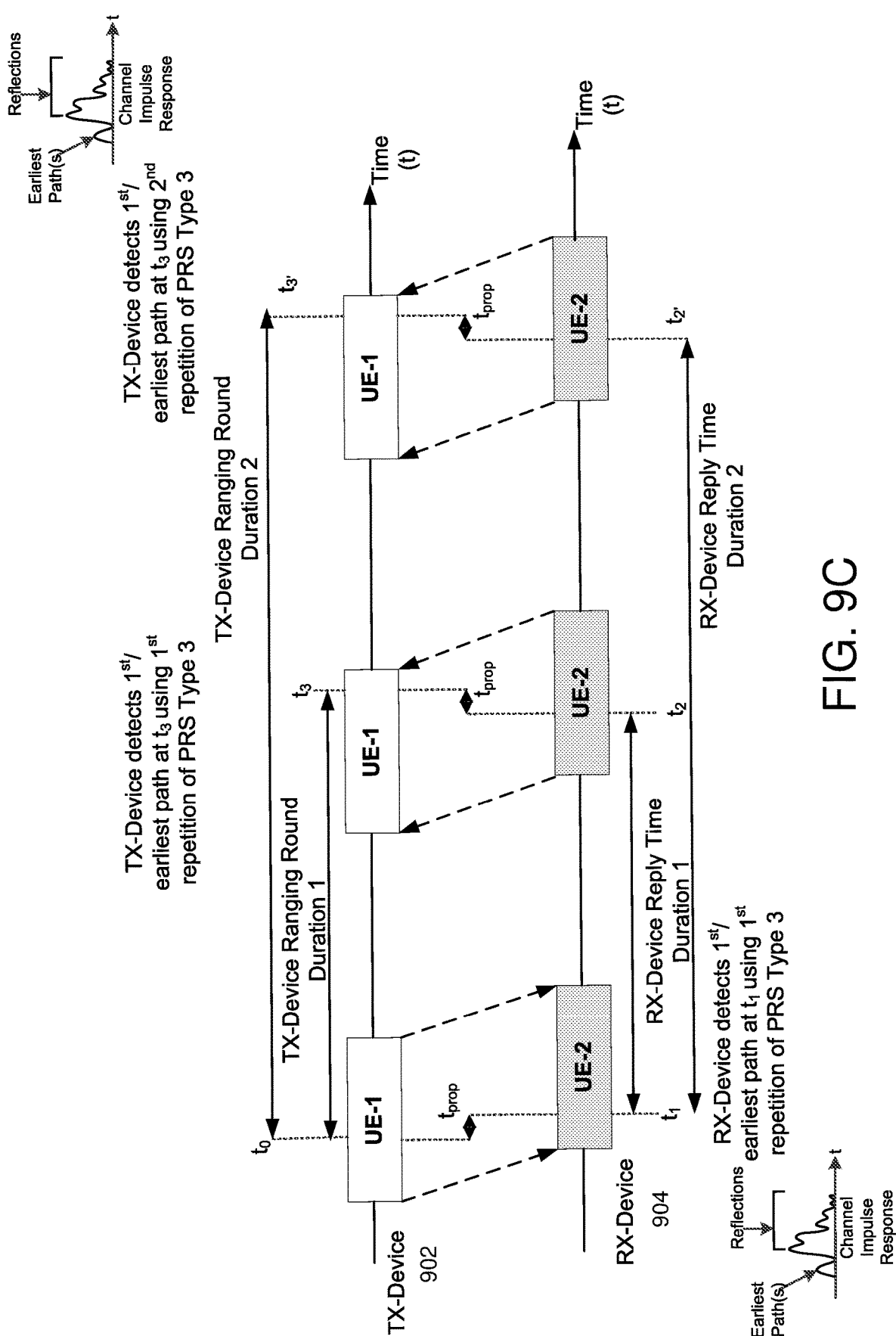
FIG. 9C is a diagram illustrating one embodiment of SS-RTT ranging procedure using PRS Type 3 SL and repetition of responses.

In another implementation, PRS Type 3 signal, or any other PRS signal, is transmitted once by a Tx UE 902; however, the Rx UE 904 responds multiple times to calculate the RTT for each of the response and utilizes all the measurements to get a robust RTT estimation, as illustrated in FIG. 9C. Additionally, the Rx UE 904, e.g., UE-2 could provide additional measurements such as a time difference between the current reply and one or more previous replies for increased robustness. A time counter can be configured to store multiple timestamp information based on multiple replies.

Figure 9D:
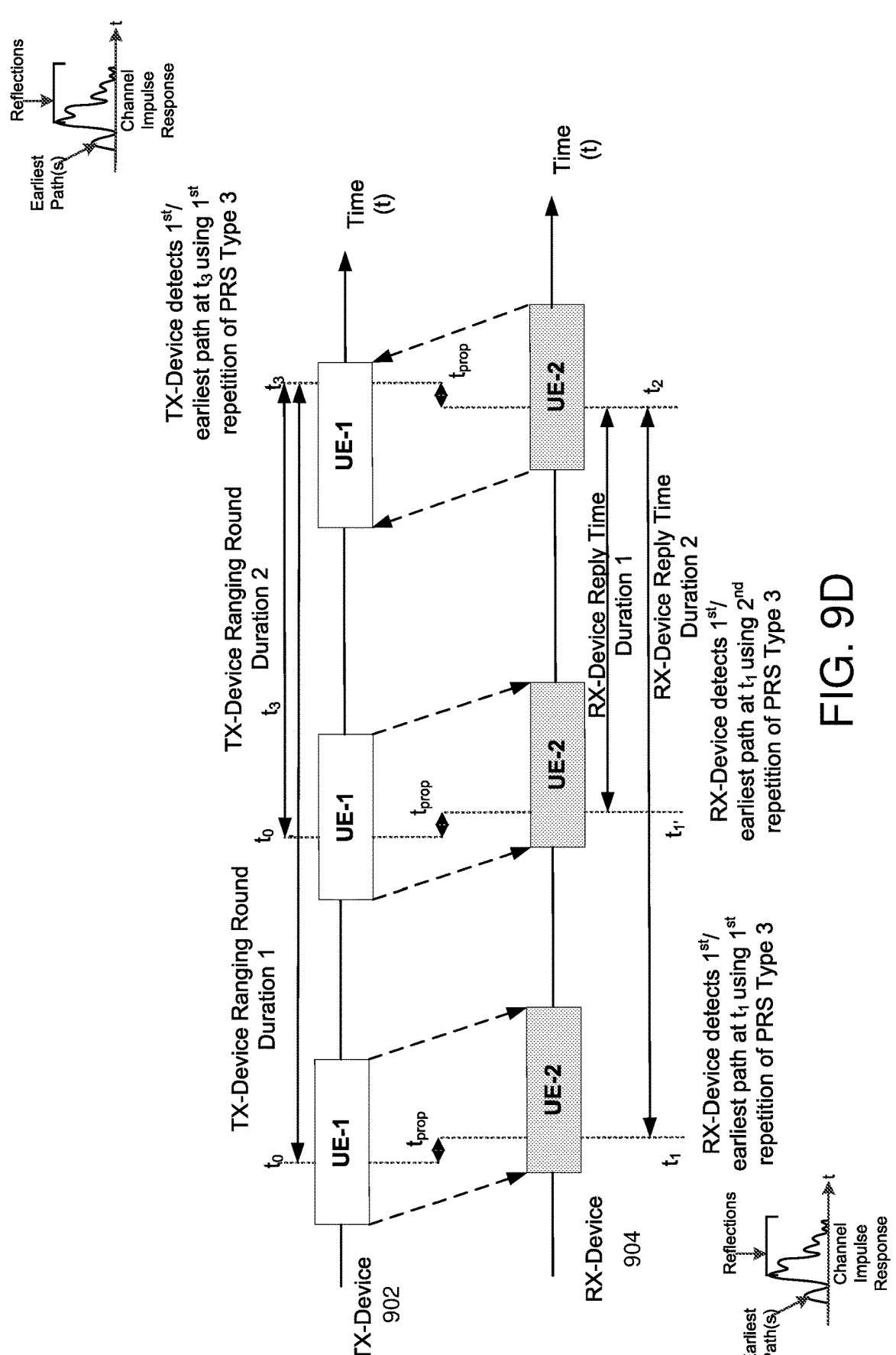
FIG. 9D is a diagram illustrating one embodiment of SS-RTT ranging procedure using repetition PRS Type 3 SL and single combined response.

In alternate implementation, PRS Type 3 signals are repeated by a Tx UE 902; however, a Rx UE 904 responds only once after the last instance of the PRS Type 3 signal is received by the Rx UE 904. The Rx UE 904 utilizes all the measurements for more accurate estimation as illustrated in FIG. 9D. Additionally, the Rx UE 904, e.g., UE 2 could provide additional measurements such as time stamps for each of the PRSs received from Tx UE 902 e.g., UE 1.

In one embodiment, the above implementations can be configured to UEs depending up on the latency and reliability requirements for ranging.

Figure 10A:
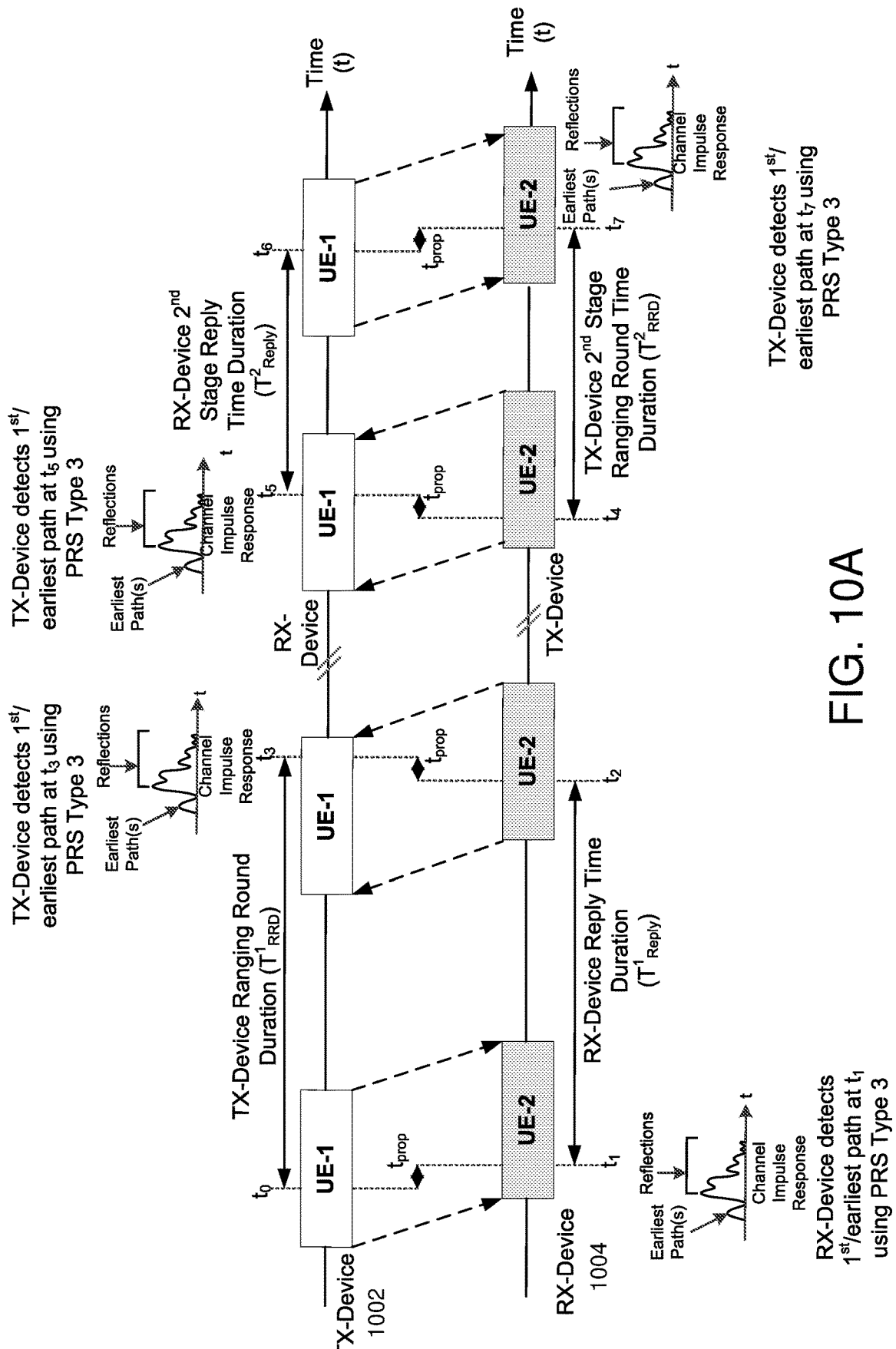
FIG. 10A is a diagram illustrating one embodiment of DS-RTT ranging procedure using PRS Type 3 for SL.

In a second embodiment, DS-RTT is an extension of SS-RTT where, in addition to SS-RTT during the first phase, UE-2 acts as an initiator to perform a second phase SS-RTT procedure with UE-1 during the first phase. FIG. 10A illustrates the concept of the DS-RTT ranging procedure between UE-1 1002 and UE-2 1004 along SL based on a PRS Type 3 configuration; however, this can also be applicable to other PRS Types.

The ranging positioning method depicted in FIG. 10A is a two-phase RTT procedure where the initiator of the first phase is UE-1 1002 and the initiator of the second phase is UE-2 1004. The aim is to improve the ranging estimate between two UEs to provide additional robust timing measurements that can be estimated in the presence of uncompensated clock offsets. In one embodiment, this ranging method can also operate based on asymmetric reply times. The resources for performing DS-RTT can be network configured (Mode 1) or based on a distributed allocation by UEs (Mode 2).

Similar to the SS-RTT embodiment, each UE/device 1002, 1004 will timestamp the transmission and reception times, which can be asymmetric depending on the SL traffic. The signal propagation time ($t_{prop}$) can be used to derive the range between the devices as function of the Tx-Device Ranging Round Durations ($T_{RRD}$) and Rx-Device Reply Time Durations ($T_{Reply}$) and is represented as follows:

23

$$\hat{t}_{prop} = \frac{(T^1_{RRD} \times T^2_{RRD}) - (T^1_{Reply} \times T^2_{Reply})}{(T^1_{RRD} + T^2_{RRD} + T^1_{Reply} + T^2_{Reply})}, \quad (2)$$

The independent clocks in UE-1 1002 and UE-2 1004 can be assumed to run at factors of $\delta_1$ and $\delta_2$, respectively, with respect to the ideal clock, which is assumed to be constant over the course of the DS-RTT exchange and has been considered in Eq. (2).

In some implementations, UE-1 1002 may concurrently perform DS-RTT with more than one Rx-Device 1004, which may either be based on PRS Type 1, PRS Type 2, and/or PRS Type 3 signals.

In one embodiment, the DS-RTT procedure may require the exchange of four messages over a SL (as shown in FIG. 10A), which can incur overhead depending on resource and latency constraints. One embodiment, shown in FIG. 10B, however, aims to reduce the message exchange of the DS-RTT procedure to three messages where the time instance at t2 of UE-2 1004 is not only used to transmit the reply report but simultaneously used to trigger the second phase of the RTT procedure without a delay by initiating the second stage RTT along with the reply report, as noted in FIG. 13, with an exemplary PRS Type 3 signal; however, this can be applicable to other PRS Types. Such an embodiment can reduce the overhead and be resource efficient while satisfying the strict latency constraints.

In a third embodiment, methods for determining the relative orientation with respect to another device transmitting exemplary PRS Type 3 signals are described and can be used in combination with the ranging methods described above as a hybrid ranging method. Furthermore, this embodiment can also be used to determine the range between two UEs based solely on the AoA estimates.

Figure 11A:
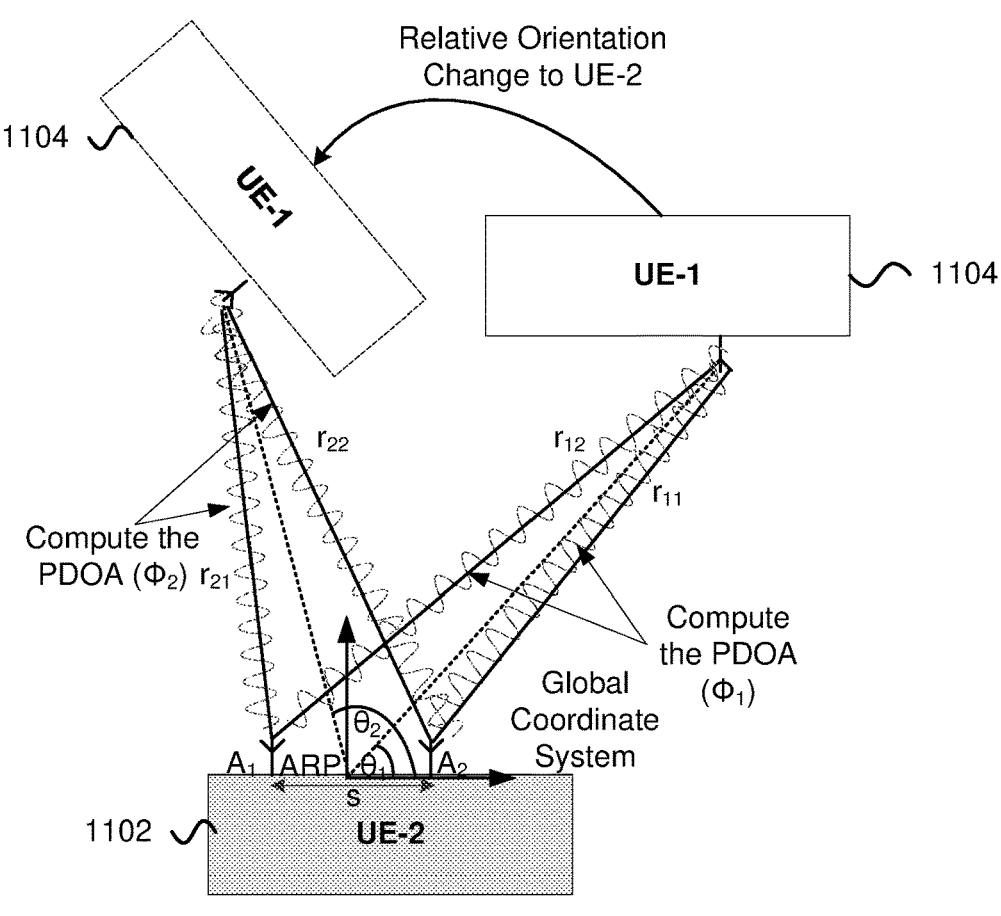
FIG. 11A is a diagram illustrating one embodiment of relative AoA estimation.

FIG. 11A shows a conceptual representation of the relative orientation procedure. Assuming a global coordinate system ("GCS") for simplicity, UE-2 1102 would be able to detect an orientation change of UE-1 1104 based on the Phase Difference of Arrivals ("PDoA") of the transmitted signals given by $\Phi_1$ and $\Phi_2$. The PDoA angles can also be dependent on the signal path range between UE-1 1104 and UE-2 1102 (given by r). This would indicate a corresponding change for the AoA estimates ($\theta_1$ and $\theta_2$), which is represented by the following expressions:

$$\theta_1 = \arcsin\left(\frac{\Phi_1 \lambda}{2\pi s}\right), \quad (3)$$

$$\theta_2 = \arcsin\left(\frac{\Phi_2 \lambda}{2\pi s}\right), \quad (4)$$

where s is the physical antenna spacing and can be uniform in the case of a uniform linear array ("ULA") implementation, provided that $$\left(s < \frac{\lambda}{2}\right),$$

$\lambda$ is wavelength, $\Phi_1$ and $\Phi_2$ are the phase difference of arrivals of the exemplary PRS Type 3 signals. The change in deviation of AoA estimates between $\theta_1$ and $\theta_2$ can assist in the indication of an orientation change, which can be reported along with the timestamp information described in the DS-RTT embodiment above in the measurement report, which can be signaled via e.g., PC5 RRC.

In another implementation, AoA estimates of $\theta_1$ and $\theta_2$ are based on local coordinate system ("LCS") of the UE antenna array and need to be translated to the GCS. The translated angles and coordinates can be computed at UE-2 1102 or reported either to UE-1 1104 or the network.

In some implementations, UE-1 1104 can signal the azimuth and elevation angles associated with exemplary PRS Type 3 signals to serve as assistance information in the computation of the AoA estimates. FIG. 11A is a basic representation of a single input multiple output ("SIMO") scenario, but this may also extend to multiple input multiple output ("MIMO") transmissions or multiple beams/panels (e.g., where the number of Tx antennas>1).

Figure 11B:
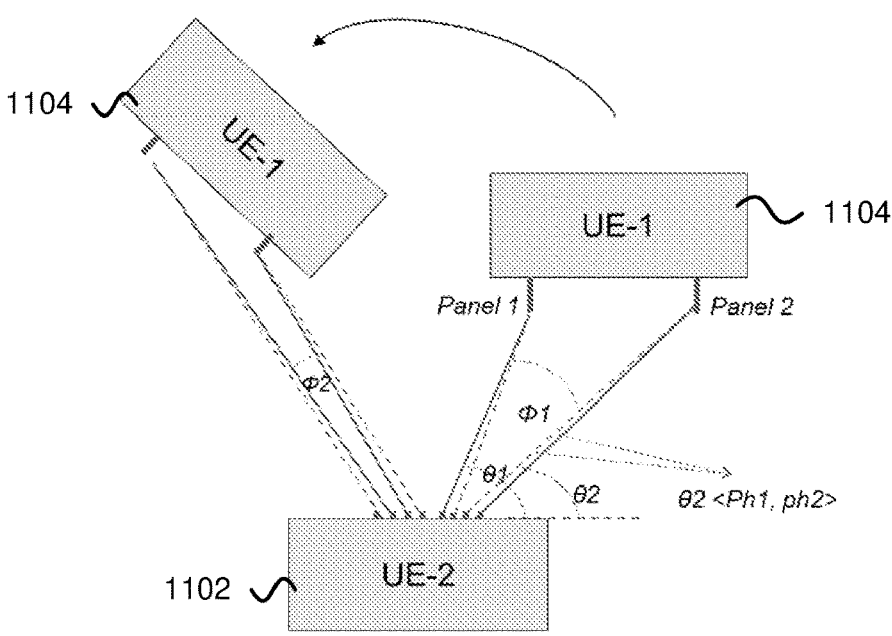
FIG. 11B is a diagram illustrating one embodiment of orientation estimation in multi-panel scenario.

In the MIMO case, AoD information related to UE-1 1104 can also be transmitted as assistance information to UE-2 1102. In multiple panel case, UE-1 1104 may use multiple panels with separation >$\lambda$ to each transmit the exemplary PRS Type 3 signal with the associated PRS configuration as shown in FIG. 11B. Upon measuring the DoA of the signals transmitted from both UE-1's 1104 panels using multiple antenna elements at UE-2's 1102 receiver, the angle between the panels can be estimated. By calculating the phase difference between the received signals at two or more antenna elements (ph1, ph2) for one PRS signal transmitted from one UE-1 panel, e.g., panel 1, the angle of arrival $\theta_1$ is estimated, same for $\theta_2$ for panel 2. The angle between the panels seen at UE-2 1102 is $\Phi_1 = \theta_1 - \theta_2$. The angle of the orientation of UE-1 1104 relative to its original orientation is estimated based on the difference between $\Phi_1$ (original orientation) and $\Phi_2$ (new orientation).

In other implementations, UE-1 1104 may concurrently perform relative AoA estimation with more than one Rx-Device to obtain the relative orientations, which may either be based on PRS Type 1 or PRS Type 2 signals or a combination of both reference signals. In alternative implementations, a combination of the methods used in FIGS. 11A and 11B can be used to obtain a robust and improved range and relative orientation estimate.

Figure 12:
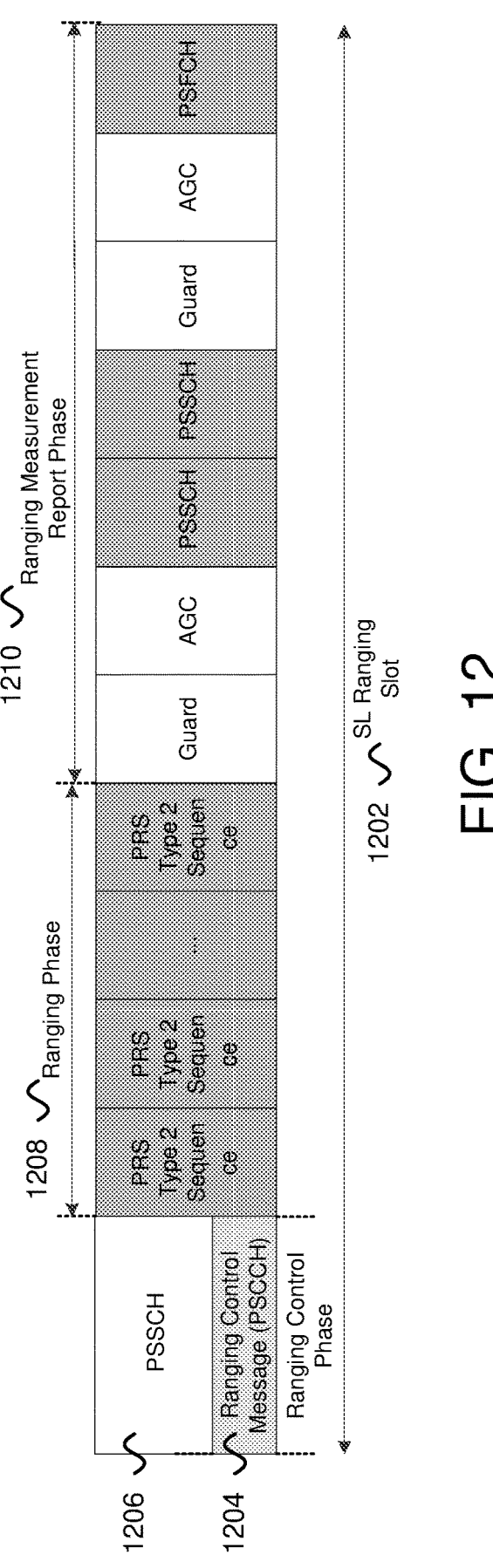
FIG. 12 is a diagram illustrating one embodiment of PRS Type 2 ranging slot framework.

A fourth embodiment describes the framework for a ranging round that includes ranging configuration, measurement processing, and measurement reporting, which can be applied to the embodiments described above. FIG. 12 illustrates a ranging slot framework for SL 1202 that can be applicable for the exemplary transmission of PRS Type 3 signals. It may be applicable to other PRS Types as described in this disclosure.

The ranging control message 1204, in one embodiment, contains information that can be transmitted using the physical sidelink control channel ("PSCCH") 1206, while a dedicated ranging phase 1208 consists of a contiguous slot where ranging methods are performed. The ranging report may make use of the PSSCH or physical sidelink feedback channel ("PSFCH") to transmit the ranging measurement report 1210.

In one embodiment, the configured resources required to perform ranging can be configured using two stage sidelink control information ("SCI") concept in SL. The ranging control messages can be carried using the second stage SCI and may consist of the following, but not limited to:

a. Time-frequency resource to perform ranging including slot structure/configuration;

b. Cast type mode for ranging, e.g., unicast, groupcast, and broadcast;

c. Fixed or variable reporting times for the ranging reports i. May include response times for the ranging reply and measurement reports;

ii. Variable reply and reporting times can be asymmetric with respect to the ranging round duration.

d. Ranging methods (e.g., as described in the embodiments above, TDOA, and/or the like)

i. Configuration of associated measurements related to a specific ranging method;

e. Secure encryption configuration for the ranging sequences.

Any updates related to the ranging control information may be indicated to the participating UEs via the second stage SCI and may include updates related to the ranging round or interval/periodicity.

Figure 10B:
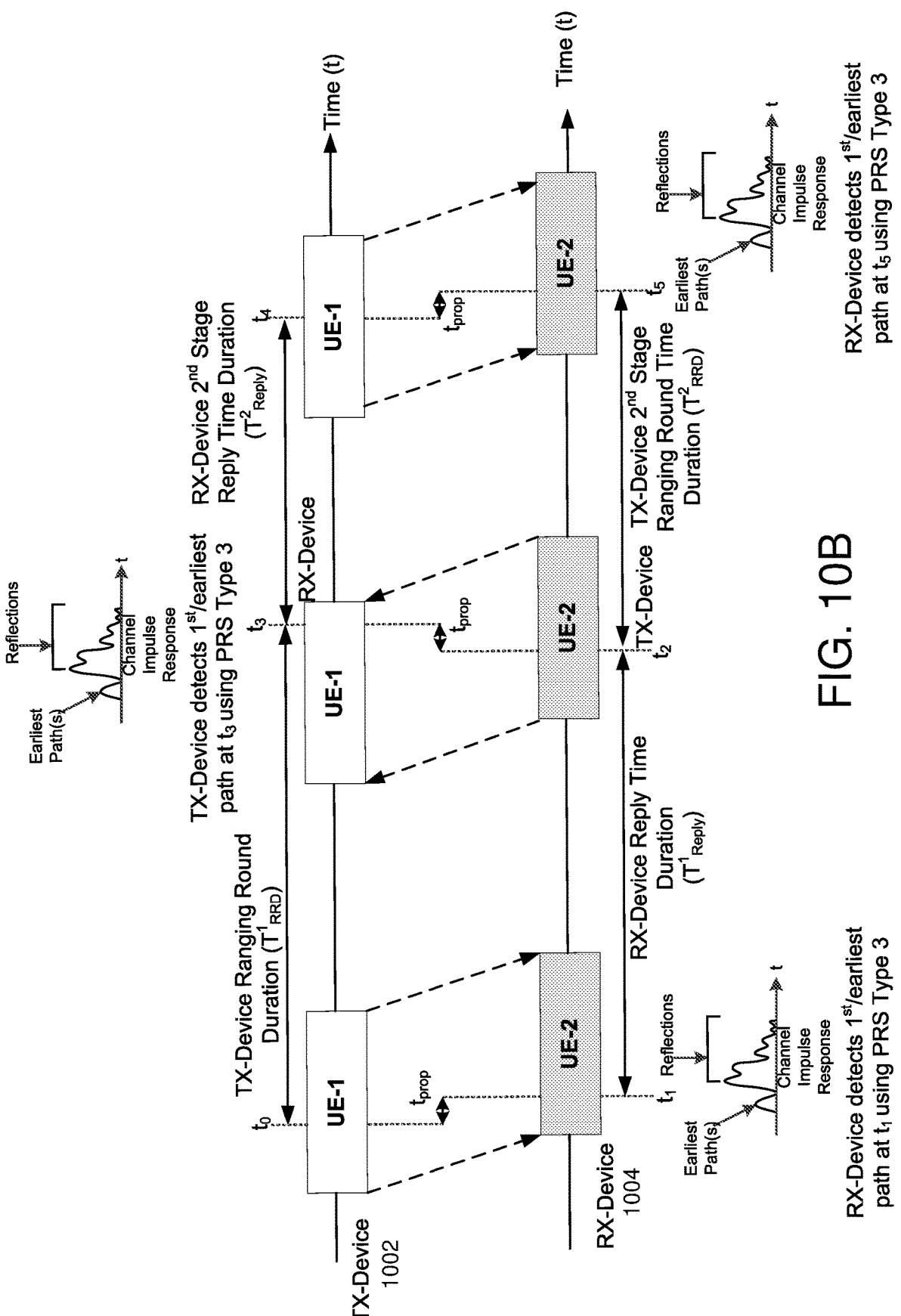
FIG. 10B is a diagram illustrating one embodiment of low latency DS-RTT.

In one embodiment, the ranging measurement in which participating UEs/devices perform the measurements and/or ranging replies related to ongoing ranging sessions includes the UE(s) that initiates the ranging round and the UE(s) that responds to the initiator. In one embodiment, each UE will measure the corresponding ranging parameters described above (e.g., timestamp information, RTT measurements, angular information, and/or the like) and can report such measurements to the intended UE depending on the applicable scenario, e.g., in the case of double sided two-way ranging ("DS-TWR") both UE-1 and UE-2 are configured to measure both the ranging round and reply time durations as depicted in FIGS. 10A and 10B. Due to the fine time resolution of the symbols, it would be important to distinguish between:

a. The transmit and reply messages sent as a part of the ranging round (e.g., $T_{RRD}$ and $T_{Reply}$ messages described above with reference to DS-RTT)

b. A measurement report containing the necessary ranging measurements (e.g., transmitted after the ranging round)

i. This can include the time difference measurements made at the device, e.g., $t_2-t_1$ as described above with reference to DS-RTT from the responder UE (UE-2) to initiator UE (UE-1).

In other implementations, the quality of the measurements can be reported, e.g., in the form of confidence intervals relating to a specific measurement, predefined margins of error, or other range reliability metrics. Table 6 shows an exemplary illustration of the confidence interval information that may be signaled as part of the measurement report. This can be applied to ranging estimates and/or AoD/AoA/DoA estimates.

TABLE 2

Confidence Level Information

| Confidence Level IE | Confidence Level (%) |
| --- | --- |
| 0 | No Confidence Level indicated |
| 1 | 10 |
| 2 | 30 |
| 3 | 50 |
| 4 | 70 |
| 5 | 90 |
| 6 | 99 |

In a fifth embodiment, the described ranging methods are supported for different cast types including unicast, broadcast, and groupcast. The ranging methods described above focused on the unicast support for RTT and AoA based ranging methods, while the focus of the subsequent embodiments describe using groupcast and broadcast ranging mechanisms.

Figure 13:
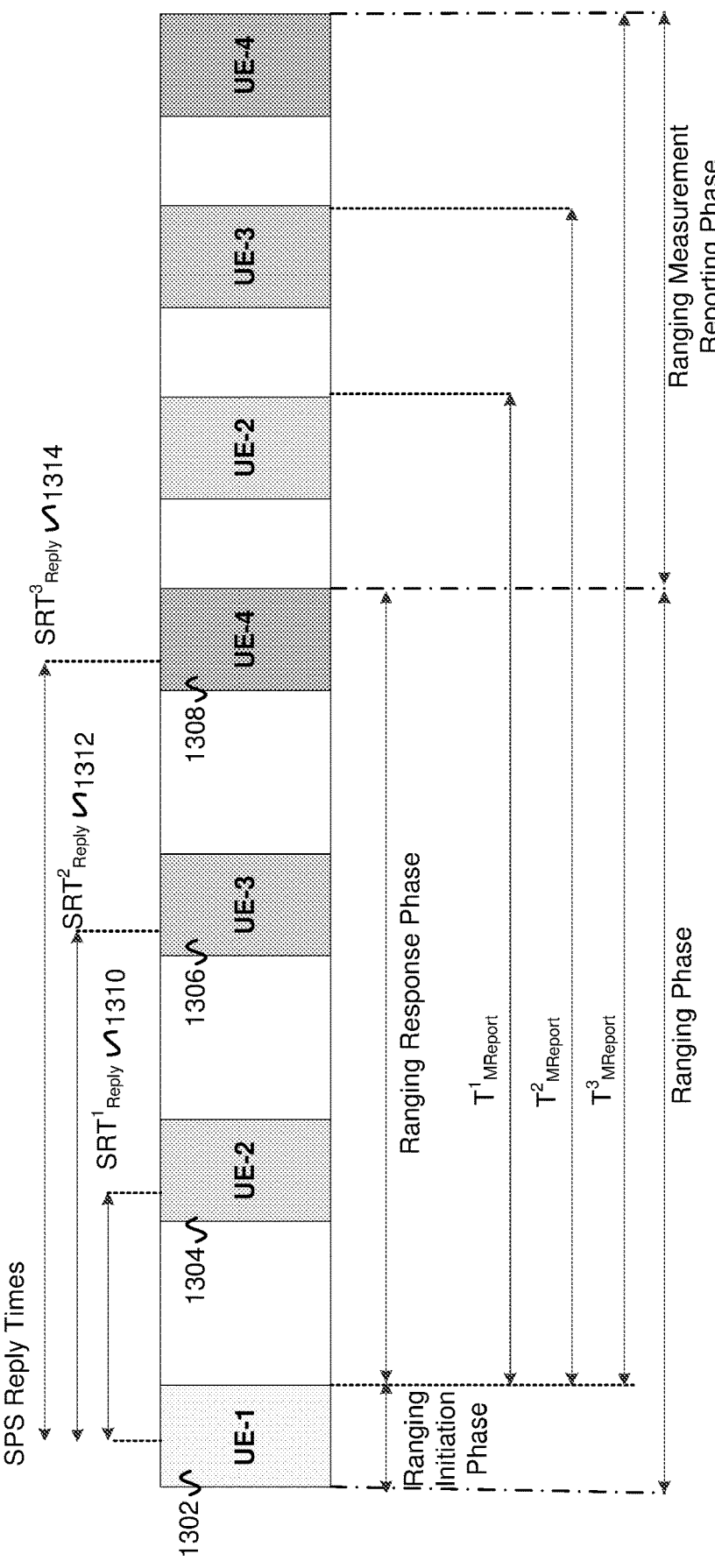
FIG. 13 is a diagram illustrating one embodiment of SPS range reporting.

In the case of groupcast ranging (one-to-many), the initiator UE may transmit an exemplary PRS Type 3 Signal (which may be extended to other PRS Types) to a set of Rx-Devices with a configured fixed reply time. This is illustrated in FIG. 13, where UE-1 1302 is the initiator of a ranging method, e.g., transmission of the PRS Type 3 signal using SS-RTT while UE-2 1304, UE-3 1306, and UE-4 1308 are responder UEs with semi-statically configured fixed reply times denoted by $SRT^1_{Reply}$ 1310, $SRT^2_{Reply}$ 1312, and $SRT^3_{Reply}$ 1314, respectively. This can be configured by the gNB as part of the resource pool configuration.

In alternative implementations such ranging reporting times can be based on a pre-configuration, which is suited for partial coverage or out-of-coverage scenarios. In other implementations, the semi-persistent scheduling ("SPS") reporting intervals can be dynamically updated based on the channel busy radio ("CBR") or channel occupancy of the resource pool.

According to a different implementation, the measurement reporting and reply time can be combined to reduce overhead during the measurement reporting phase. The measurement report size would be such that it can accommodate the transmission during the ranging phase.

In a different implementation, the measurement response time $T_{MR}$ can serve as an upper bound for the transmission of the ranging measurement report by a UE can be given by Ranging Delay Budget$\leq T_{MR}$, provided that SL resources are available for the transmission of the ranging measurement report. The expected $T_{MR}$ response time can be based on a particular ranging budget delay or a based on a priority of a particular ranging service.

In one embodiment, UE-1 1302 can in addition recommend suitable SL resources for the transmission of the ranging report from the Rx-UEs. This can enable the Rx-UEs to select SL resources rapidly and efficiently for measurement reporting.

In an implementation making use of the DS-RTT method described above, it should be noted that the initiator (UE-1 1302) may also transmit a measurement report to the responder UEs (e.g., UE-2 1304, UE-3 1306, and UE-4 1308).

In one embodiment, the broadcast ranging procedure is an extension of the groupcast embodiment where instead of a single initiator UE, there can be more than one UE acting as an initiator UE. In the case of the SS-RTT method, for instance, the responder UEs are required to send the measurement reports, while in the case of the DS-RTT methods, the number of initiators involved in the broadcast ranging procedure would also be required to transmit measurement reports to the responder UE.

Figure 14:
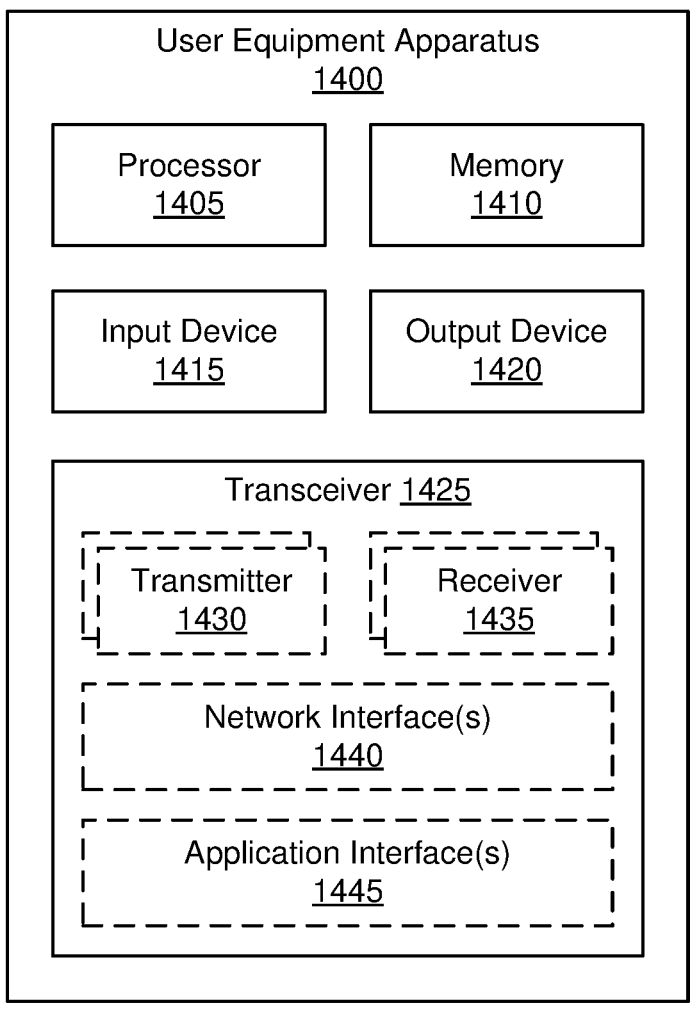
FIG. 14 is a block diagram illustrating one embodiment of a user equipment apparatus that may be used for sidelink ranging for positioning reference signal types.

FIG. 14 depicts a user equipment apparatus 1400 that may be used for sidelink ranging for positioning reference signal types, according to embodiments of the disclosure. In various embodiments, the user equipment apparatus 1400 is used to implement one or more of the solutions described above. The user equipment apparatus 1400 may be one embodiment of the remote unit 105 and/or the UE 205, described above. Furthermore, the user equipment apparatus 1400 may include a processor 1405, a memory 1410, an input device 1415, an output device 1420, and a transceiver 1425.

In some embodiments, the input device 1415 and the output device 1420 are combined into a single device, such as a touchscreen. In certain embodiments, the user equipment apparatus 1400 may not include any input device 1415 and/or output device 1420. In various embodiments, the user equipment apparatus 1400 may include one or more of: the processor 1405, the memory 1410, and the transceiver 1425, and may not include the input device 1415 and/or the output device 1420.

As depicted, the transceiver 1425 includes at least one transmitter 1430 and at least one receiver 1435. In some embodiments, the transceiver 1425 communicates with one or more cells (or wireless coverage areas) supported by one or more base units 121. In various embodiments, the transceiver 1425 is operable on unlicensed spectrum. Moreover, the transceiver 1425 may include multiple UE panels supporting one or more beams. Additionally, the transceiver 1425 may support at least one network interface 1440 and/or application interface(s) 1445. The application interface(s) 1445 may support one or more APIs. The network interface(s) 1440 may support 3GPP reference points, such as Uu, N1, PC5, etc. Other network interfaces 1440 may be supported, as understood by one of ordinary skill in the art.

The processor 1405, in one embodiment, may include any known controller capable of executing computer-readable instructions and/or capable of performing logical operations. For example, the processor 1405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1405 executes instructions stored in the memory 1410 to perform the methods and routines described herein. The processor 1405 is communicatively coupled to the memory 1410, the input device 1415, the output device 1420, and the transceiver 1425.

In various embodiments, the processor 1405 controls the user equipment apparatus 1400 to implement the above-described UE behaviors. In certain embodiments, the processor 1405 may include an application processor (also known as "main processor") which manages application-domain and operating system ("OS") functions and a baseband processor (also known as "baseband radio processor") which manages radio functions.

The memory 1410, in one embodiment, is a computer readable storage medium. In some embodiments, the memory 1410 includes volatile computer storage media. For example, the memory 1410 may include a RAM, including dynamic RAM ("DRAM"), synchronous dynamic RAM ("SDRAM"), and/or static RAM ("SRAM"). In some embodiments, the memory 1410 includes non-volatile computer storage media. For example, the memory 1410 may include a hard disk drive, a flash memory, or any other suitable non-volatile computer storage device. In some embodiments, the memory 1410 includes both volatile and non-volatile computer storage media.

In some embodiments, the memory 1410 stores data related to sidelink ranging for positioning reference signal types. For example, the memory 1410 may store various parameters, panel/beam configurations, resource assignments, policies, and the like as described above. In certain embodiments, the memory 1410 also stores program code and related data, such as an operating system or other controller algorithms operating on the apparatus 1400.

The input device 1415, in one embodiment, may include any known computer input device including a touch panel, a button, a keyboard, a stylus, a microphone, or the like. In some embodiments, the input device 1415 may be integrated with the output device 1420, for example, as a touchscreen or similar touch-sensitive display. In some embodiments, the input device 1415 includes a touchscreen such that text may be input using a virtual keyboard displayed on the touchscreen and/or by handwriting on the touchscreen. In some embodiments, the input device 1415 includes two or more different devices, such as a keyboard and a touch panel.

The output device 1420, in one embodiment, is designed to output visual, audible, and/or haptic signals. In some embodiments, the output device 1420 includes an electronically controllable display or display device capable of outputting visual data to a user. For example, the output device 1420 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1420 may include a wearable display separate from, but communicatively coupled to, the rest of the user equipment apparatus 1400, such as a smart watch, smart glasses, a heads-up display, or the like. Further, the output device 1420 may be a component of a smart phone, a personal digital assistant, a television, a table computer, a notebook (laptop) computer, a personal computer, a vehicle dashboard, or the like.

In certain embodiments, the output device 1420 includes one or more speakers for producing sound. For example, the output device 1420 may produce an audible alert or notification (e.g., a beep or chime). In some embodiments, the output device 1420 includes one or more haptic devices for producing vibrations, motion, or other haptic feedback. In some embodiments, all, or portions of the output device 1420 may be integrated with the input device 1415. For example, the input device 1415 and output device 1420 may form a touchscreen or similar touch-sensitive display. In other embodiments, the output device 1420 may be located near the input device 1415.

The transceiver 1425 communicates with one or more network functions of a mobile communication network via one or more access networks. The transceiver 1425 operates under the control of the processor 1405 to transmit messages, data, and other signals and also to receive messages, data, and other signals. For example, the processor 1405 may selectively activate the transceiver 1425 (or portions thereof) at times to send and receive messages.

The transceiver 1425 includes at least transmitter 1430 and at least one receiver 1435. One or more transmitters 1430 may be used to provide UL communication signals to a base unit 121, such as the UL transmissions described herein. Similarly, one or more receivers 1435 may be used to receive DL communication signals from the base unit 121, as described herein. Although only one transmitter 1430 and one receiver 1435 are illustrated, the user equipment apparatus 1400 may have any suitable number of transmitters 1430 and receivers 1435. Further, the transmitter(s) 1430 and the receiver(s) 1435 may be any suitable type of transmitters and receivers. In one embodiment, the transceiver 1425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1425, transmitters 1430, and receivers 1435 may be implemented as physically separate components that access a shared hardware resource and/or software resource, such as for example, the network interface 1440.

In various embodiments, one or more transmitters 1430 and/or one or more receivers 1435 may be implemented and/or integrated into a single hardware component, such as a multi transceiver chip, a system-on-a-chip, an Application-Specific Integrated Circuit ("ASIC"), or other type of hardware component. In certain embodiments, one or more transmitters 1430 and/or one or more receivers 1435 may be implemented and/or integrated into a multi-chip module. In some embodiments, other components such as the network interface 1440 or other hardware components/circuits may be integrated with any number of transmitters 1430 and/or receivers 1435 into a single chip. In such embodiment, the transmitters 1430 and receivers 1435 may be logically configured as a transceiver 1425 that uses one more common control signals or as modular transmitters 1430 and receivers 1435 implemented in the same hardware chip or in a multi-chip module.

In one embodiment, the transceiver 1425 transmits a sidelink ("SL") ranging configuration comprising one or more SL ranging methods corresponding to a ranging session to a responder device, transmits a SL positioning reference signal ("PRS") to the responder device, and receives, according to the one or more SL ranging methods and in response to the SL PRS, a ranging reply and measurement report from the responder device. In one embodiment, the processor 1405 estimates ranging information based on the ranging reply and measurement report received from the responder device to determine a range between the initiator apparatus and the responder device.

In one embodiment, the processor 1405 estimates ranging information as a function of a ranging round duration of the initiator apparatus, a reply time duration of the responder device, and a signal propagation time.

In one embodiment, the processor 1405 estimates the reply time duration within a margin based on periodic measurements from the responder device.

In one embodiment, the processor 1405 further estimates ranging information based on baseband and radio frequency timing delays exchanged between the initiator apparatus and the responding device.

In one embodiment, the transceiver 1425 transmits the SL PRS to the responding device a plurality of times and the processor 1405 performs ranging for each SL PRS to increase the accuracy of the estimated ranging.

In one embodiment, the transceiver 1425 receives a plurality of ranging replies from the responding device in response to the SL PRS, the processor 1405 estimating the ranging for each of the plurality of ranging replies to increase the accuracy of the estimated ranging.

In one embodiment, the transceiver 1425 receives a SL PRS from the responding device as part of a double sided RTT ("DS-RTT") ranging method performed on both the initiator apparatus and the responding device.

In one embodiment, the transceiver 1425 receives the ranging reply and the processor 1405 simultaneously triggers a new phase of the DS-RTT ranging method during a same time instance of the DS-RTT ranging method without a delay.

In one embodiment, the transceiver 1425 transmits the ranging configuration and the receives the ranging reply and measurement report using sidelink control information ("SCI") for a sidelink connection between the initiator apparatus and the responder device.

In one embodiment, the SL slot comprises a ranging phase, wherein a portion of the SL slot is used to transmit SL PRS the responding device, and a ranging measurement and reporting phase, wherein a portion of the SL slot is used to receive SL measurement reports from the responding device.

In one embodiment, the transceiver 1425 transmits the PRS to a plurality of responder devices using a groupcast ranging session.

In one embodiment, the one or more ranging methods comprises a round trip time ("RTT") ranging method, the RTT selected from the group comprising a single-sided round-trip time ("SS-RTT"), a double sided RTT ("DS-RTT"), a low-latency DS-RTT.

In one embodiment, the one or more ranging methods comprises a relative orientation method selected from the group comprising an angle of arrival ("AoA"), a direction of arrival ("DoA"), and an angle of departure ("AoD").

In one embodiment, the transceiver 1425 receives a sidelink ("SL") ranging configuration comprising one or more SL ranging methods corresponding to a ranging session from an initiator device and receives a SL positioning reference signal ("PRS") from the initiator device. In one embodiment, the processor 1405 generates a ranging measurement report comprising timing information for estimating ranging information between the responder apparatus and the initiator device. In one embodiment, the transceiver 1425 transmits, according to the one or more SL ranging methods and in response to the SL PRS, a ranging reply and the ranging measurement report to the initiator device.

Figure 15:
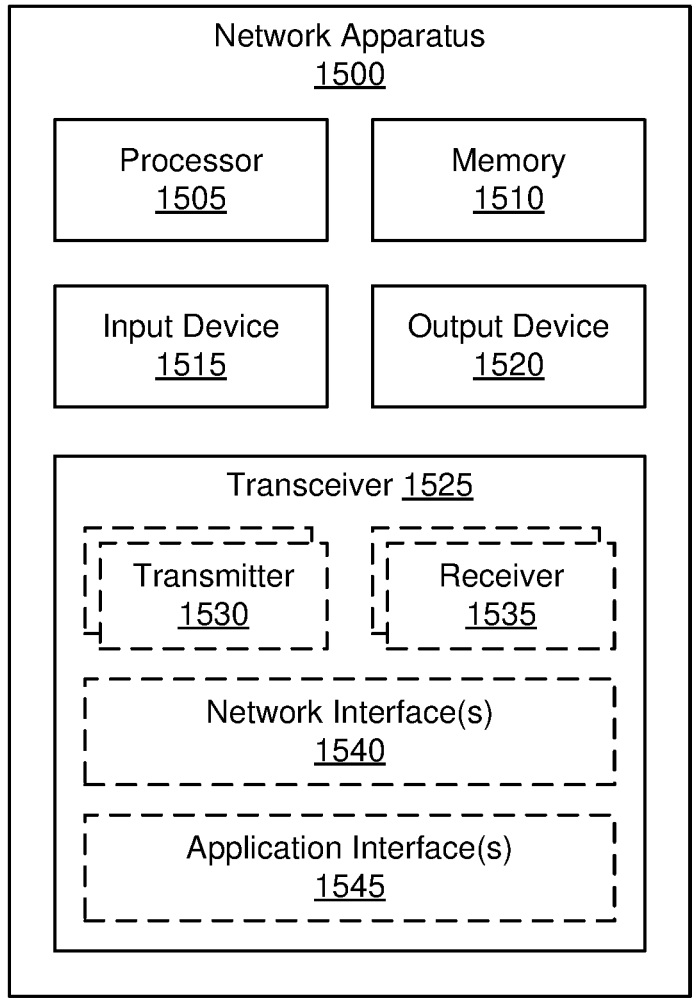
FIG. 15 is a block diagram illustrating one embodiment of a network equipment apparatus that may be used for sidelink ranging for positioning reference signal types.

FIG. 15 depicts a network apparatus 1500 that may be used for sidelink ranging for positioning reference signal types, according to embodiments of the disclosure. In one embodiment, network apparatus 1500 may be one implementation of a RAN node, such as the base unit 121 and/or the RAN node 210, as described above. Furthermore, the base network apparatus 1500 may include a processor 1505, a memory 1510, an input device 1515, an output device 1520, and a transceiver 1525.

In some embodiments, the input device 1515 and the output device 1520 are combined into a single device, such as a touchscreen. In certain embodiments, the network apparatus 1500 may not include any input device 1515 and/or output device 1520. In various embodiments, the network apparatus 1500 may include one or more of: the processor 1505, the memory 1510, and the transceiver 1525, and may not include the input device 1515 and/or the output device 1520.

As depicted, the transceiver 1525 includes at least one transmitter 1530 and at least one receiver 1535. Here, the transceiver 1525 communicates with one or more remote units 175. Additionally, the transceiver 1525 may support at least one network interface 1540 and/or application interface 1545. The application interface(s) 1545 may support one or more APIs. The network interface(s) 1540 may support 3GPP reference points, such as Uu, N1, N2 and N3. Other network interfaces 1540 may be supported, as understood by one of ordinary skill in the art.

The processor 1505, in one embodiment, may include any known controller capable of executing computer-readable instructions and/or capable of performing logical operations. For example, the processor 1505 may be a microcontroller, a microprocessor, a CPU, a GPU, an auxiliary processing unit, a FPGA, or similar programmable controller. In some embodiments, the processor 1505 executes instructions stored in the memory 1510 to perform the methods and routines described herein. The processor 1505 is communicatively coupled to the memory 1510, the input device 1515, the output device 1520, and the transceiver 1525.

In various embodiments, the network apparatus 1500 is a RAN node (e.g., gNB) that communicates with one or more UEs, as described herein. In such embodiments, the processor 1505 controls the network apparatus 1500 to perform the above-described RAN behaviors. When operating as a RAN node, the processor 1505 may include an application processor (also known as "main processor") which manages application-domain and operating system ("OS") functions and a baseband processor (also known as "baseband radio processor") which manages radio functions.

The memory 1510, in one embodiment, is a computer readable storage medium. In some embodiments, the memory 1510 includes volatile computer storage media. For example, the memory 1510 may include a RAM, including dynamic RAM ("DRAM"), synchronous dynamic RAM ("SDRAM"), and/or static RAM ("SRAM"). In some embodiments, the memory 1510 includes non-volatile computer storage media. For example, the memory 1510 may include a hard disk drive, a flash memory, or any other suitable non-volatile computer storage device. In some embodiments, the memory 1510 includes both volatile and non-volatile computer storage media.

In some embodiments, the memory 1510 stores data related to sidelink ranging for positioning reference signal types. For example, the memory 1510 may store parameters, configurations, resource assignments, policies, and the like, as described above. In certain embodiments, the memory 1510 also stores program code and related data, such as an operating system or other controller algorithms operating on the apparatus 1500.

The input device 1515, in one embodiment, may include any known computer input device including a touch panel, a button, a keyboard, a stylus, a microphone, or the like. In some embodiments, the input device 1515 may be integrated with the output device 1520, for example, as a touchscreen or similar touch-sensitive display. In some embodiments, the input device 1515 includes a touchscreen such that text may be input using a virtual keyboard displayed on the touchscreen and/or by handwriting on the touchscreen. In some embodiments, the input device 1515 includes two or more different devices, such as a keyboard and a touch panel.

The output device 1520, in one embodiment, is designed to output visual, audible, and/or haptic signals. In some embodiments, the output device 1520 includes an electronically controllable display or display device capable of outputting visual data to a user. For example, the output device 1520 may include, but is not limited to, an LCD display, an LED display, an OLED display, a projector, or similar display device capable of outputting images, text, or the like to a user. As another, non-limiting, example, the output device 1520 may include a wearable display separate from, but communicatively coupled to, the rest of the network apparatus 1500, such as a smart watch, smart glasses, a heads-up display, or the like. Further, the output device 1520 may be a component of a smart phone, a personal digital assistant, a television, a table computer, a notebook (laptop) computer, a personal computer, a vehicle dashboard, or the like.

In certain embodiments, the output device 1520 includes one or more speakers for producing sound. For example, the output device 1520 may produce an audible alert or notification (e.g., a beep or chime). In some embodiments, the output device 1520 includes one or more haptic devices for producing vibrations, motion, or other haptic feedback. In some embodiments, all, or portions of the output device 1520 may be integrated with the input device 1515. For example, the input device 1515 and output device 1520 may form a touchscreen or similar touch-sensitive display. In other embodiments, the output device 1520 may be located near the input device 1515.

The transceiver 1525 includes at least transmitter 1530 and at least one receiver 1535. One or more transmitters 1530 may be used to communicate with the UE, as described herein. Similarly, one or more receivers 1535 may be used to communicate with network functions in the PLMN and/or RAN, as described herein. Although only one transmitter 1530 and one receiver 1535 are illustrated, the network apparatus 1500 may have any suitable number of transmitters 1530 and receivers 1535. Further, the transmitter(s) 1530 and the receiver(s) 1535 may be any suitable type of transmitters and receivers.

In one embodiment, the transceiver 1525 transmits a sidelink ("SL") ranging configuration comprising one or more SL ranging methods corresponding to a ranging session to a responder device, transmits a SL positioning reference signal ("PRS") to the responder device, and receives, according to the one or more SL ranging methods and in response to the SL PRS, a ranging reply and measurement report from the responder device. In one embodiment, the processor 1505 estimates ranging information based on the ranging reply and measurement report received from the responder device to determine a range between the initiator apparatus and the responder device.

In one embodiment, the processor 1505 estimates ranging information as a function of a ranging round duration of the initiator apparatus, a reply time duration of the responder device, and a signal propagation time.

In one embodiment, the processor 1505 estimates the reply time duration within a margin based on periodic measurements from the responder device.

In one embodiment, the processor 1505 further estimates ranging information based on baseband and radio frequency timing delays exchanged between the initiator apparatus and the responding device.

In one embodiment, the transceiver 1525 transmits the SL PRS to the responding device a plurality of times and the processor 1505 performs ranging for each SL PRS to increase the accuracy of the estimated ranging.

In one embodiment, the transceiver 1525 receives a plurality of ranging replies from the responding device in response to the SL PRS, the processor 1505 estimating the ranging for each of the plurality of ranging replies to increase the accuracy of the estimated ranging.

In one embodiment, the transceiver 1525 receives a SL PRS from the responding device as part of a double sided RTT ("DS-RTT") ranging method performed on both the initiator apparatus and the responding device.

In one embodiment, the transceiver 1525 receives the ranging reply and the processor 1505 simultaneously triggers a new phase of the DS-RTT ranging method during a same time instance of the DS-RTT ranging method without a delay.

In one embodiment, the transceiver 1525 transmits the ranging configuration and the receives the ranging reply and measurement report using sidelink control information ("SCI") for a sidelink connection between the initiator apparatus and the responder device.

In one embodiment, the SL slot comprises a ranging phase, wherein a portion of the SL slot is used to transmit SL PRS the responding device, and a ranging measurement and reporting phase, wherein a portion of the SL slot is used to receive SL measurement reports from the responding device.

In one embodiment, the transceiver 1525 transmits the PRS to a plurality of responder devices using a groupcast ranging session.

In one embodiment, the one or more ranging methods comprises a round trip time ("RTT") ranging method, the RTT selected from the group comprising a single-sided round-trip time ("SS-RTT"), a double sided RTT ("DS-RTT"), a low-latency DS-RTT.

In one embodiment, the one or more ranging methods comprises a relative orientation method selected from the group comprising an angle of arrival ("AoA"), a direction of arrival ("DoA"), and an angle of departure ("AoD").

In one embodiment, the transceiver 1525 receives a sidelink ("SL") ranging configuration comprising one or more SL ranging methods corresponding to a ranging session from an initiator device and receives a SL positioning reference signal ("PRS") from the initiator device. In one embodiment, the processor 1505 generates a ranging measurement report comprising timing information for estimating ranging information between the responder apparatus and the initiator device. In one embodiment, the transceiver 1525 transmits, according to the one or more SL ranging methods and in response to the SL PRS, a ranging reply and the ranging measurement report to the initiator device.

FIG. 16 depicts one embodiment of a method 1600 for sidelink ranging for positioning reference signal types, according to embodiments of the disclosure. In various embodiments, the method 1600 is performed by a user equipment device in a mobile communication network, such as the remote unit 105, the UE 205, and/or the user equipment apparatus 1400, described above, and/or a network equipment apparatus 1500, such as base unit 121. In some embodiments, the method 1600 is performed by a processor, such as a microcontroller, a microprocessor, a CPU, a GPU, an auxiliary processing unit, a FPGA, or the like.

In one embodiment, the method 1600 begins and transmits 1605 a sidelink ("SL") ranging configuration comprising one or more SL ranging methods corresponding to a ranging session to a responder device. In one embodiment, the method 1600 transmits 1610 a SL positioning reference signal ("PRS") to the responder device. In one embodiment, the method 1600 receives 1615, according to the one or more SL ranging methods and in response to the SL PRS, a ranging reply and measurement report from the responder device. In one embodiment, the method 1600 estimates 1620 ranging information based on the ranging reply and measurement report received from the responder device to determine a range between the initiator device and the responder device. The method 1600 ends.

FIG. 17 depicts one embodiment of a method 1700 for sidelink ranging for positioning reference signal types, according to embodiments of the disclosure. In various embodiments, the method 1700 is performed by a user equipment device in a mobile communication network, such as the remote unit 105, the UE 205, and/or the user equipment apparatus 1400, described above, and/or a network equipment apparatus 1500, such as base unit 121. In some embodiments, the method 1700 is performed by a processor, such as a microcontroller, a microprocessor, a CPU, a GPU, an auxiliary processing unit, a FPGA, or the like.

In one embodiment, the method 1700 begins and receives 1705 a sidelink ("SL") ranging configuration comprising one or more SL ranging methods corresponding to a ranging session from an initiator device. In one embodiment, the method 1700 receives 1710 a SL positioning reference signal ("PRS") from the initiator device. In one embodiment, the method 1700 generates 1715 a ranging measurement report comprising timing information for estimating ranging information between the responder apparatus and the initiator device. In one embodiment, the method 1700 transmits 1720, according to the one or more SL ranging methods and in response to the SL PRS, a ranging reply and the ranging measurement report to the initiator device. The method 1700 ends.

Disclosed herein is a first apparatus for sidelink ranging for positioning reference signal types, according to embodiments of the disclosure. The first apparatus may be implemented by a user equipment device in a mobile communication network, such as the remote unit 105, the UE 205, and/or the user equipment apparatus 1400, described above, and/or a network equipment apparatus 1500, such as base unit 121. In one embodiment, the first apparatus is implemented by a processor, such as a microcontroller, a microprocessor, a CPU, a GPU, an auxiliary processing unit, a FPGA, or the like.

In one embodiment, the first apparatus includes a transceiver that transmits a sidelink ("SL") ranging configuration comprising one or more SL ranging methods corresponding to a ranging session to a responder device, transmits a SL positioning reference signal ("PRS") to the responder device, and receives, according to the one or more SL ranging methods and in response to the SL PRS, a ranging reply and measurement report from the responder device. In one embodiment, the first apparatus includes a processor that estimates ranging information based on the ranging reply and measurement report received from the responder device to determine a range between the initiator apparatus and the responder device.

In one embodiment, the processor estimates ranging information as a function of a ranging round duration of the initiator apparatus, a reply time duration of the responder device, and a signal propagation time.

In one embodiment, the processor estimates the reply time duration within a margin based on periodic measurements from the responder device.

In one embodiment, the processor further estimates ranging information based on baseband and radio frequency timing delays exchanged between the initiator apparatus and the responding device.

In one embodiment, the transceiver transmits the SL PRS to the responding device a plurality of times and the processor performs ranging for each SL PRS to increase the accuracy of the estimated ranging.

In one embodiment, the transceiver receives a plurality of ranging replies from the responding device in response to the SL PRS, the processor estimating the ranging for each of the plurality of ranging replies to increase the accuracy of the estimated ranging.

In one embodiment, the transceiver receives a SL PRS from the responding device as part of a double sided RTT ("DS-RTT") ranging method performed on both the initiator apparatus and the responding device.

In one embodiment, the transceiver receives the ranging reply and the processor simultaneously triggers a new phase of the DS-RTT ranging method during a same time instance of the DS-RTT ranging method without a delay.

In one embodiment, the transceiver transmits the ranging configuration and the receives the ranging reply and measurement report using sidelink control information ("SCI") for a sidelink connection between the initiator apparatus and the responder device.

In one embodiment, the SL slot comprises a ranging phase, wherein a portion of the SL slot is used to transmit SL PRS the responding device, and a ranging measurement and reporting phase, wherein a portion of the SL slot is used to receive SL measurement reports from the responding device.

In one embodiment, the transceiver transmits the PRS to a plurality of responder devices using a groupcast ranging session.

In one embodiment, the one or more ranging methods comprises a round trip time ("RTT") ranging method, the RTT selected from the group comprising a single-sided round-trip time ("SS-RTT"), a double sided RTT ("DS-RTT"), a low-latency DS-RTT.

In one embodiment, the one or more ranging methods comprises a relative orientation method selected from the group comprising an angle of arrival ("AoA"), a direction of arrival ("DoA"), and an angle of departure ("AoD").

Disclosed herein is a first method for sidelink ranging for positioning reference signal types, according to embodiments of the disclosure. The first method is performed by a user equipment device in a mobile communication network, such as the remote unit 105, the UE 205, and/or the user equipment apparatus 1400, described above, and/or a network equipment apparatus 1500, such as base unit 121. In some embodiments, the first method is performed by a processor, such as a microcontroller, a microprocessor, a CPU, a GPU, an auxiliary processing unit, a FPGA, or the like.

In one embodiment, the first method transmits a sidelink ("SL") ranging configuration comprising one or more SL ranging methods corresponding to a ranging session to a responder device, transmits a SL positioning reference signal ("PRS") to the responder device, and receives, according to the one or more SL ranging methods and in response to the SL PRS, a ranging reply and measurement report from the responder device. In one embodiment, the first method estimates ranging information based on the ranging reply and measurement report received from the responder device to determine a range between the initiator apparatus and the responder device.

In one embodiment, the first method estimates ranging information as a function of a ranging round duration of the initiator apparatus, a reply time duration of the responder device, and a signal propagation time.

In one embodiment, the first method estimates the reply time duration within a margin based on periodic measurements from the responder device.

In one embodiment, the first method further estimates ranging information based on baseband and radio frequency timing delays exchanged between the initiator apparatus and the responding device.

In one embodiment, the first method transmits the SL PRS to the responding device a plurality of times and the processor performs ranging for each SL PRS to increase the accuracy of the estimated ranging.

In one embodiment, the first method receives a plurality of ranging replies from the responding device in response to the SL PRS, the processor estimating the ranging for each of the plurality of ranging replies to increase the accuracy of the estimated ranging.

In one embodiment, the first method receives a SL PRS from the responding device as part of a double sided RTT ("DS-RTT") ranging method performed on both the initiator apparatus and the responding device.

In one embodiment, the first method receives the ranging reply and the processor simultaneously triggers a new phase of the DS-RTT ranging method during a same time instance of the DS-RTT ranging method without a delay.

In one embodiment, the first method transmits the ranging configuration and the receives the ranging reply and measurement report using sidelink control information ("SCI") for a sidelink connection between the initiator apparatus and the responder device.

In one embodiment, the SL slot comprises a ranging phase, wherein a portion of the SL slot is used to transmit SL PRS the responding device, and a ranging measurement and reporting phase, wherein a portion of the SL slot is used to receive SL measurement reports from the responding device.

In one embodiment, the first method transmits the PRS to a plurality of responder devices using a groupcast ranging session.

In one embodiment, the one or more ranging methods comprises a round trip time ("RTT") ranging method, the RTT selected from the group comprising a single-sided round-trip time ("SS-RTT"), a double sided RTT ("DS-RTT"), a low-latency DS-RTT.

In one embodiment, the one or more ranging methods comprises a relative orientation method selected from the group comprising an angle of arrival ("AoA"), a direction of arrival ("DoA"), and an angle of departure ("AoD").

Disclosed herein is a second apparatus for sidelink ranging for positioning reference signal types, according to embodiments of the disclosure. The second apparatus may be implemented by a user equipment device in a mobile communication network, such as the remote unit 105, the UE 205, and/or the user equipment apparatus 1400, described above, and/or a network equipment apparatus 1500, such as base unit 121. In one embodiment, the second apparatus is implemented by a processor, such as a microcontroller, a microprocessor, a CPU, a GPU, an auxiliary processing unit, a FPGA, or the like.

In one embodiment, the second apparatus includes a transceiver that receives a sidelink ("SL") ranging configuration comprising one or more SL ranging methods corresponding to a ranging session from an initiator device and receives a SL positioning reference signal ("PRS") from the initiator device. In one embodiment, the second apparatus includes a processor that generates a ranging measurement report comprising timing information for estimating ranging information between the responder apparatus and the initiator device. In one embodiment, the transceiver transmits, according to the one or more SL ranging methods and in response to the SL PRS, a ranging reply and the ranging measurement report to the initiator device.

Disclosed herein is a second method for sidelink ranging for positioning reference signal types, according to embodiments of the disclosure. The second method is performed by a user equipment device in a mobile communication network, such as the remote unit 105, the UE 205, and/or the user equipment apparatus 1400, described above, and/or a network equipment apparatus 1500, such as base unit 121. In some embodiments, the second method is performed by a processor, such as a microcontroller, a microprocessor, a CPU, a GPU, an auxiliary processing unit, a FPGA, or the like.

In one embodiment, the second method receives a sidelink ("SL") ranging configuration comprising one or more SL ranging methods corresponding to a ranging session from an initiator device and receives a SL positioning reference signal ("PRS") from the initiator device. In one embodiment, the second method generates a ranging measurement report comprising timing information for estimating ranging information between the responder apparatus and the initiator device. In one embodiment, the second method transmits, according to the one or more SL ranging methods and in response to the SL PRS, a ranging reply and the ranging measurement report to the initiator device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:

at least one memory; and at least one processor coupled with the at least one memory and configured to cause the UE to:

transmit, to a responder device, a sidelink ("SL") ranging configuration message that initiates a ranging session and that indicates one or more SL ranging methods that comprise at least an SL round-trip-time ("SL-RTT") method;

transmit, to the responder device during the ranging session, an SL positioning reference signal ("PRS") according to the SL-RTT method;

receive, from the responder device and in response to the SL PRS, a ranging reply message and measurement report comprising SL receive-transmit ("Rx-Tx") timing difference measurement information corresponding to the responder device; and estimate, based on the SL Rx-Tx timing difference measurement information and locally measured timing information of the UE, a range between the UE and the responder device.

2. The UE of claim 1, wherein the at least one processor is configured to cause the UE to estimate the ranging information as a function of a ranging round duration of the UE, a reply time duration of the responder device, and a signal propagation time, wherein the ranging round duration and the reply time duration of the responder device is based on SL PRS Rx-Tx time difference measurements.

3. The UE of claim 1, wherein the at least one processor is configured to cause the UE to transmit an SL PRS capability request message to the responder device and receive an SL PRS capability response message.

4. The UE of claim 1, wherein the at least one processor is configured to cause the UE to estimate the ranging information based on baseband and radio frequency timing delays associated with the UE and the responder device.

5. The UE of claim 1, wherein the at least one processor is configured to cause the UE to:

transmit the SL PRS, to the responder device, a plurality of times; and perform ranging for each transmitted SL PRS to increase an accuracy of the estimated ranging.

6. The UE of claim 1, wherein the at least one processor is configured to cause the UE to:

receive a plurality of ranging replies, wherein each ranging reply comprises an SL PRS Rx-Tx time difference measurement from the responder device in response to the SL PRS transmission; and estimate the ranging for each of the plurality of ranging replies to increase an accuracy of the estimated ranging.

7. The UE of claim 1, wherein the at least one processor is configured to cause the UE to receive an SL PRS from the responder device as part of a double sided RTT ("DS-RTT") ranging method.

8. The UE of claim 7, wherein the at least one processor is configured to cause the UE to:

receive the ranging reply message; and simultaneously trigger a new phase of the DS-RTT ranging method during a same time instance of the DS-RTT ranging method without a delay.

9. The UE of claim 1, wherein the at least one processor is configured to cause the UE to:

transmit the SL ranging configuration message using an SL control information ("SCI"), wherein the SCI indicates one or more resources to perform ranging, a slot configuration, a cast type information, or a combination thereof; and receive the ranging reply message and measurement report based on the same SCI.

10. The UE of claim 1, wherein a portion of a slot is used to transmit SL ranging control information via physical sidelink control channel ("PSCCH"), a portion of the slot is used to transmit a SL PRS Type 1 to the responder device, and a portion of the slot is configured to transmit PSSCH data.

11. The UE of claim 1, wherein the at least one processor is configured to cause the UE to receive time stamp information from the responder device as part of the measurement report, wherein the time stamp information comprises an actual SL PRS reception time or an SL PRS transmission time, or both.

12. The UE of claim 1, wherein the SL ranging configuration message indicates a ranging method that comprises an SL-RTT ranging method comprising a single-sided round-trip time ("SS-RTT"), a double sided RTT ("DS-RTT"), or a low-latency DS-RTT.

13. The UE of claim 1, wherein the SL ranging configuration message indicates one or more SL ranging methods that comprise a relative orientation method comprising an angle of arrival ("AoA"), a direction of arrival ("DoA"), or an angle of departure ("AoD").

14. A method performed by a user equipment ("UE"), the method comprising:

transmitting, to a responder device, a sidelink ("SL") ranging configuration message that initiates a ranging session and that indicates one or more SL ranging methods that comprise at least an SL round-trip-time ("SL-RTT") method;

transmitting, to the responder device during the ranging session, an SL positioning reference signal ("PRS") according to the SL-RTT method;

receiving, from the responder device and in response to the SL PRS, a ranging reply message and measurement report comprising SL receive-transmit ("Rx-Tx") timing difference measurement information corresponding to from the responder device; and estimating, based on the SL Rx-Tx timing difference measurement information and locally measured timing information of the UE, a range between the UE and the responder device.

15. A user equipment ("UE") for wireless communication, comprising:

at least one memory; and at least one processor coupled with the at least one memory and configured to cause the UE to:

receive, from an initiator device, a sidelink ("SL") ranging configuration message that initiates a ranging session and that indicates one or more SL ranging methods that comprise at least an SL round-trip-time ("SL-RTT") method;

receive, from the initiator device during the ranging session, an SL positioning reference signal ("PRS") according to the SL-RTT method;

measure an SL receive-transmit ("Rx-Tx") timing difference of the SL PRS;

generate a ranging reply message and measurement report comprising the measured SL Rx-Tx timing difference corresponding to the initiator device; and transmit, according to the SL ranging configuration message and in response to the SL PRS, the ranging reply message and measurement report to the initiator device.

16. A processor for wireless communication, comprising:

at least one controller coupled with at least one memory and configured to cause the processor to:

transmit, to a responder device, a sidelink ("SL") ranging configuration message that initiates a ranging session and that indicates one or more SL ranging methods that comprise at least an SL round-trip-time ("SL-RTT") method;

transmit, to the responder device during the ranging session, an SL positioning reference signal ("PRS") according to the SL-RTT method;

receive, from the responder device and in response to the SL PRS, a ranging reply message and measurement report comprising SL receive-transmit ("Rx-Tx") timing difference measurement information corresponding to from the responder device; and estimate, based on the SL Rx-Tx timing difference measurement information and locally measured timing information of a user equipment ("UE"), a range between the UE and the responder device.

17. The processor of claim 16, wherein the at least one controller is configured to cause the processor to estimate the ranging information as a function of a ranging round duration of the processor, a reply time duration of the responder device, and a signal propagation time, wherein the ranging round duration and the reply time duration of the responder device is based on SL PRS Rx-Tx time difference measurements.

18. The processor of claim 16, wherein the at least one controller is configured to cause the processor to transmit an SL PRS capability request message to the responder device and receive an SL PRS capability response message.

19. The processor of claim 16, wherein the at least one controller is configured to cause the processor to estimate the ranging information based on baseband and radio frequency timing delays associated with the processor and the responder device.

20. The processor of claim 16, wherein the at least one controller is configured to cause the processor to:

receive a plurality of ranging replies wherein each ranging reply comprises a SL PRS Rx-Tx time difference measurement from the responder device in response to the SL PRS transmission; and estimate the ranging for each of the plurality of ranging replies to increase an accuracy of the estimated ranging.

* * * * *